United States Patent
Tabata et al.

(10) Patent No.: US 7,601,093 B2
(45) Date of Patent: Oct. 13, 2009

(54) VEHICULAR DRIVE CONTROL APPARATUS AND METHOD FOR CONTROLLING A VEHICULAR DRIVE APPARATUS

(75) Inventors: Atsushi Tabata, Okazaki (JP); Kenta Kumazaki, Toyota (JP); Tooru Matsubara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/230,923

(22) Filed: Sep. 8, 2008

(65) Prior Publication Data

US 2009/0069147 A1    Mar. 12, 2009

(30) Foreign Application Priority Data

Sep. 11, 2007    (JP) ............................. 2007-235277

(51) Int. Cl.
    B60W 10/08 (2006.01)
    B60W 10/04 (2006.01)
(52) U.S. Cl. ..................................... 477/5; 180/65.285
(58) Field of Classification Search ..................... 477/3, 477/5; 180/65.285
    See application file for complete search history.

(56) References Cited

U.S. PATENT DOCUMENTS

2008/0153661 A1* 6/2008 Shibata et al. ................. 477/3
2008/0300100 A1* 12/2008 Matsubara et al. ............. 477/5
2009/0017984 A1* 1/2009 Shibata et al. ................. 477/3

FOREIGN PATENT DOCUMENTS

| JP | A-61-099745 | 5/1986 |
| JP | A-2005-337491 | 12/2005 |
| JP | 2006321392 A | * 11/2006 |
| JP | A 2006-321392 | 11/2006 |

\* cited by examiner

*Primary Examiner*—Roger Pang
(74) *Attorney, Agent, or Firm*—Oliff & Berridge, PLC

(57) ABSTRACT

When shifts are performed at the same time in first and second transmitting portions and the gear ratios of those transmitting portions change in opposite directions, a simultaneous shift control unit controls the shift in the first transmitting portion using a first electric motor and controls the shift in the second transmitting portion using a second electric motor such that the shift in one transmitting portion, from among the first and second transmitting portions, ends while the shift in the other transmitting portion is being performed. The shifts in the two transmitting portions will not end at the same time so the amount of shift shock felt by an occupant can be reduced. Also, the shifts in the two transmitting portions are controlled by the first and second electric motors so the progress of the shifts in those transmitting portions can be actively adjusted.

8 Claims, 13 Drawing Sheets

FIG. 2

| | C0 | C1 | C2 | C3 | B0 | B1 | B2 | GEAR RATIO | STEP |
|---|---|---|---|---|---|---|---|---|---|
| 1st | ◎ | ○ | | | | | ○ | 3.683 | 1.380 |
| 2nd | | ○ | | | ◎ | | ○ | 2.669 | 1.398 |
| 3rd | ◎ | ○ | | | | | | 1.909 | 1.380 |
| 4th | | ○ | | | ◎ | ○ | | 1.383 | 1.383 |
| 5th | ◎ | | | ○ | | ○ | | 1.000 | 1.383 |
| 6th | ◎ | | | ○ | | ○ | | 0.661 | 1.380 |
| 7th | | | | ○ | ◎ | ○ | | 0.479 | TOTAL 7.687 |
| R (ENGINE) | | | ○ | | | | ○ | 1.951 | |
| R (MOTOR) | | ○ | | | | | ○ | 1.951 | |
| N | | | | | | | ○ | | |

○:APPLIED  ◎:APPLIED DURING STEPPED CONTROL, RELEASED DURING CONTINUOUSLY VARIABLE CONTROL  □:APPLIED ONLY DURING STEPPED CONTROL

FIG. 9
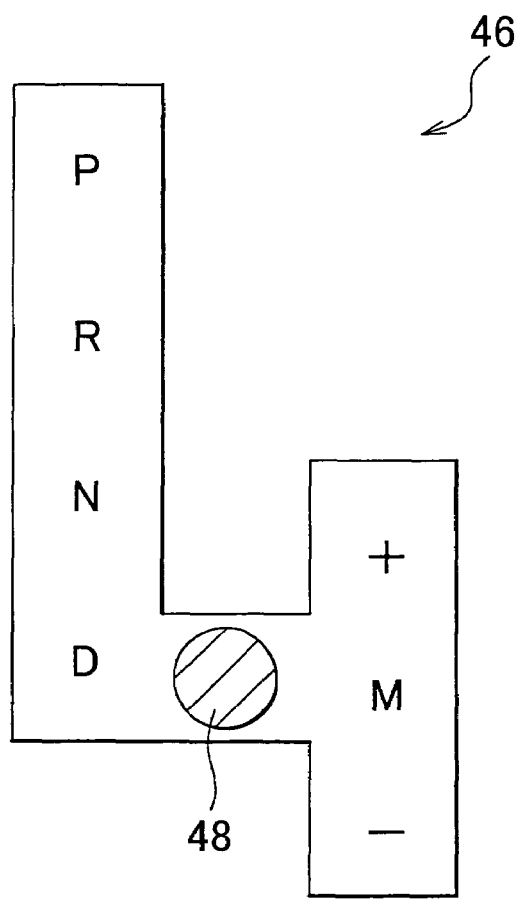
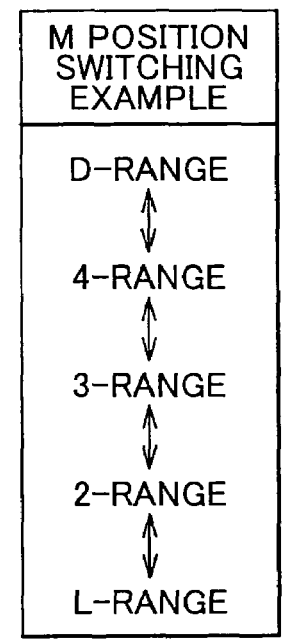

FIG. 13

| | C0 | C1 | C2 | B0 | B1 | B2 | B3 | GEAR RATIO | STEP |
|---|---|---|---|---|---|---|---|---|---|
| 1st | ◎ | ○ | | | ○ | | | 4.241 | 1.420 |
| 2nd | | ○ | | ◎ | ○ | | | 2.986 | 1.415 |
| 3rd | ◎ | | ○ | | ○ | | | 2.111 | 1.420 |
| 4th | | | ○ | ◎ | ○ | | | 1.482 | 1.487 |
| 5th | ◎ | ○ | ○ | | | | | 1.000 | 1.522 |
| 6th | ◎ | | ○ | | | ○ | | 0.657 | 1.420 |
| 7th | | | ○ | ◎ | | ○ | | 0.463 | TOTAL 9.164 |
| R (ENGINE) | | ○ | | | | | ○ | 1.917 | |
| R (MOTOR) | | ○ | | | ○ | | | 1.917 | |
| N | | ○ | | | | | | | |

○:APPLIED    ◎:APPLIED DURING STEPPED CONTROL, RELEASED DURING CONTINUOUSLY VARIABLE CONTROL

VEHICULAR DRIVE CONTROL APPARATUS AND METHOD FOR CONTROLLING A VEHICULAR DRIVE APPARATUS

INCORPORATION BY REFERENCE

The disclosure of Japanese Patent Application No. 2007-235277 filed on Sep. 11, 2007, including the specification, drawings and abstract is incorporated herein by reference in its entirety.

BACKGROUND OF THE INVENTION

1. Field of the Invention

The invention relates to a vehicular drive control apparatus and a method for controlling a vehicular drive apparatus. More particularly, the invention relates to a vehicular drive control apparatus which is provided with a first transmitting portion and a second transmitting portion, and reduces shift shock when a shift is performed in the first transmitting portion at the same time that a shift is performed in the second transmitting portion. The invention also relates to a method for controlling a vehicular drive apparatus provided with a first transmitting portion and a second transmitting portion, which reduces shift shock when a shift is performed in the first transmitting portion at the same time that a shift is performed in the second transmitting portion.

2. Description of the Related Art

Japanese Patent Application Publication No. 2005-337491 (JP-A-2005-337491) describes a vehicular drive apparatus in which an internal combustion engine, a first transmitting portion, a second transmitting portion, and driving wheels are connected in series. According to the clutch and brake application chart shown in FIG. 2 of JP-A-2005-337491, in a control apparatus of that vehicular drive apparatus there is no shift pattern in which the first transmitting portion and the second transmitting portion are shifted simultaneously in a normal shift operation. For example, in FIG. 2 of JP-A-2005-337491, during a shift from 4th gear to 5th gear, a shift is performed in the first transmitting portion but not in the second transmitting portion at that time. However, although not common knowledge, a shift pattern in which the first transmitting portion and the second transmitting portion are shifted simultaneously is conceivable depending on the structure of the planetary gear sets of the first and second transmitting portions.

Typically, when a shift is performed in an automatic transmission, shift shock occurs at the end of the shift, i.e., at the end of an inertia phase when the input rotation speed of the automatic transmission changes. Therefore, when a control apparatus of a vehicular drive apparatus has a shift pattern in which the first transmitting portion and the second transmitting portion are shifted at the same time, and the first and second transmitting portions are shifted at the same time and those shifts end at the same time, it is likely that an occupant will feel significant shift shock such that comfort is lost. However, the control apparatus of the vehicular drive apparatus described in JP-A-2005-337491 does not have a shift pattern in which the first transmitting portion and the second transmitting portion are shifted at the same time. Therefore there is no mention in JP-A-2005-337491 of control to reduce the potential discomfort due to significant shift shock being felt by an occupant as a result of shifts in the first and second transmitting portions ending at the same time.

SUMMARY OF THE INVENTION

This invention thus provides a vehicular drive control apparatus which is provided with a first transmitting portion and a second transmitting portion, and reduces the possibility of an occupant feeling significant shift shock caused by shifts in the first and second transmitting portions ending at the same time, as well as a method for controlling a vehicular drive apparatus provided with a first transmitting portion and a second transmitting portion, which reduces the possibility of an occupant feeling significant shift shock caused by shifts in the first and second transmitting portions ending at the same time.

A first aspect of the invention relates to a vehicular drive control apparatus that includes a first transmitting portion; a second transmitting portion; and at least one electric motor which is connected, so as to be able to transmit power, to a rotating element of the first transmitting portion or the second transmitting portion, the rotation speed of the rotating element changing as a shift in the first transmitting portion or the second transmitting portion progresses. When a shift is performed in the first transmitting portion at the same time that a shift is performed in the second transmitting portion and the direction in which a gear ratio of the first transmitting portion changes is opposite the direction in which the gear ratio of the second transmitting portion changes, the at least one electric motor controls the shift in one or both of the first transmitting portion and the second transmitting portion such that the shift in one of the transmitting portions, from among the first transmitting portion and the second transmitting portion, ends while the shift in the other transmitting portion, from among the first transmitting portion and the second transmitting portion, is being performed.

In the aspect described above, when a shift is performed in the first transmitting portion at the same time that a shift is performed in the second transmitting portion and the direction in which a gear ratio of the first transmitting portion changes is opposite the direction in which the gear ratio of the second transmitting portion changes, an inertia phase of the shift in one transmitting portion, from among the first transmitting portion and the second transmitting portion, whichever has the gear ratio that changes in the opposite direction as the direction in which the gear ratio of the vehicular drive control apparatus changes, may be started after the inertia phase of the shift in the other transmitting portion, from among the first transmitting portion and the second transmitting portion, whichever has the gear ratio that changes in the same direction as the direction in which the gear ratio of the vehicular drive control apparatus changes, has started, and the shift in the one transmitting portion may be ended while the shift in the other transmitting portion is being performed.

In the aspect described above, the shift in the first transmitting portion and the shift in the second transmitting portion may be controlled by hydraulic control, and the at least one electric motor may be used in conjunction with the hydraulic control in shift control of one or both of the first transmitting portion and the second transmitting portion.

In the aspect described above, when a shift is performed in the first transmitting portion at the same time that a shift is performed in the second transmitting portion and the direction in which a gear ratio of the first transmitting portion changes is opposite the direction in which the gear ratio of the second transmitting portion changes, the shift in the first transmitting portion may be ended during the inertia phase of the shift in the second transmitting portion.

In the aspect described above, the first transmitting portion may be connected to an internal combustion engine and the second transmitting portion may constitute a portion of a power transmitting path from the first transmitting portion to a driving wheel.

In the structure described above, the vehicular drive control apparatus may include a first electric motor and a second electric motor as the at least one electric motor, the first transmitting portion may have a plurality of rotating elements, and the first electric motor and the internal combustion engine may be connected, so as to be able to transmit power, to different rotating elements of the first transmitting portion. Also, when a shift is performed in the first transmitting portion at the same time that a shift is performed in the second transmitting portion and the direction in which the gear ratio of the first transmitting portion changes is opposite the direction in which the gear ratio of the second transmitting portion changes, the vehicular drive control apparatus may control the change in the speed of the internal combustion engine using the first electric motor.

Alternatively, in the structure described above, the vehicular drive control apparatus may include a first electric motor and a second electric motor as the at least one electric motor, and the first electric motor may be connected, so as to be able to transmit power, to the rotating element of the first transmitting portion. Also, when a shift is performed in the first transmitting portion at the same time that a shift is performed in the second transmitting portion and the direction in which the gear ratio of the first transmitting portion changes is opposite the direction in which the gear ratio of the second transmitting portion changes, the vehicular drive control apparatus may control the rotation speed of the first electric motor according to a change in an input rotation speed of the second transmitting portion.

Also, in the structure described above, output torque of the internal combustion engine may be reduced when the speed of the internal combustion engine is changing during the shift in the first transmitting portion.

According to the foregoing aspect, when a shift is performed in the first transmitting portion at the same time that a shift is performed in the second transmitting portion and the direction in which a gear ratio of the first transmitting portion changes is opposite the direction in which the gear ratio of the second transmitting portion changes, the at least one electric motor controls the shift in one or both of the first transmitting portion and the second transmitting portion such that the shift in one of the transmitting portions, from among the first transmitting portion and the second transmitting portion, ends while the shift in the other transmitting portion, from among the first transmitting portion and the second transmitting portion, is being performed. As a result, the two shifts will not end at the same time so the amount of shift shock felt by an occupant can be reduced. Also, the shift in the other transmitting portion ends after the shift in the one transmitting portion has already ended so the shift control load at the end of the shift in the other transmitting portion can be reduced, which enables the accuracy of the control of the shift in the other transmitting portion to be improved. As a result, shift shock that occurs when the shift in the other transmitting portion ends can be reduced. Also, the shift is controlled by the electric motor so the progress of the shift in the first transmitting portion or the second transmitting portion that is connected to the at least one electric motor can be actively adjusted.

According to the foregoing structure, when a shift is performed in the first transmitting portion at the same time that a shift is performed in the second transmitting portion and the direction in which a gear ratio of the first transmitting portion changes is opposite the direction in which the gear ratio of the second transmitting portion changes, an inertia phase of the shift in one transmitting portion, from among the first transmitting portion and the second transmitting portion, whichever has the gear ratio that changes in the opposite direction as the direction in which the gear ratio of the vehicular drive control apparatus changes, is started after the inertia phase of the shift in the other transmitting portion, from among the first transmitting portion and the second transmitting portion, whichever has the gear ratio that changes in the same direction as the direction in which the gear ratio of the vehicular drive control apparatus changes, has started, and the shift in the one transmitting portion is ended while the shift in the other transmitting portion is being performed. As a result, even though the rate of change in the speed of the internal combustion engine that is connected to this vehicular drive control apparatus may fluctuate during the shift in the vehicular drive control apparatus, it is possible to prevent the direction in which the speed of the internal combustion engine changes from reversing, which reduces the likelihood of an occupant feeling an unpleasant sensation during the shift.

According to the foregoing structure, the shift in the first transmitting portion and the shift in the second transmitting portion is controlled by hydraulic control, and the electric motor is used in conjunction with the hydraulic control in shift control of one or both of the first transmitting portion and the second transmitting portion. Therefore, the shift in one of the transmitting portions (either the first transmitting portion or the second transmitting portion) can be actively ended by controlling the operating state of the electric motor, while the shift in the other transmitting portion is being performed.

According to the foregoing structure, when a shift is performed in the first transmitting portion at the same time that a shift is performed in the second transmitting portion and the direction in which a gear ratio of the first transmitting portion changes is opposite the direction in which the gear ratio of the second transmitting portion changes, the shift in the first transmitting portion is ended during the inertia phase of the shift in the second transmitting portion. As a result, the two shifts will not end at the same time so the amount of shift shock felt by an occupant can be reduced. Also, the shift in the second transmitting portion ends after the shift in the first transmitting portion has already ended so the shift control load at the end of the shift in the second transmitting portion can be reduced, which enables the accuracy of the control of the shift in the second transmitting portion to be improved. As a result, shift shock that occurs when the shift in the second transmitting portion ends can be reduced.

According to the foregoing structure, the first transmitting portion is connected to an internal combustion engine and the second transmitting portion constitutes a portion of a power transmitting path from the first transmitting portion to a driving wheel. Therefore, the first transmitting portion and the second transmitting portion are connected in series so the change width of the gear ratio of the overall vehicular drive control apparatus can be increased by performing shifts in both the first transmitting portion and the second transmitting portion. Also, when the shift in the first transmitting portion is ended during the inertia phase of the shift in the second transmitting portion, the power transmitting path in the second transmitting portion is not completely connected when the shift in the first transmitting portion ends because a shift in the second transmitting portion is being performed so shift shock in the first transmitting portion can be suppressed from being transmitted to the driving wheels.

According to the foregoing structure, the vehicular drive control apparatus includes a first electric motor and a second electric motor as the at least one electric motor, and the first electric motor may be connected, so as to be able to transmit power, to the rotating element of the first transmitting portion. Also, when a shift is performed in the first transmitting portion at the same time that a shift is performed in the second transmitting portion and the direction in which the gear ratio of the first transmitting portion changes is opposite the direction in which the gear ratio of the second transmitting portion changes, the vehicular drive control apparatus controls the rotation speed of the first electric motor according to a change in an input rotation speed of the second transmitting portion. As a result, it is possible to reduce the effect that a change in the speed of the internal combustion engine has on the shifts in the first transmitting portion and the second transmitting portion. Also, it is possible to prevent the direction in which the speed of the internal combustion engine changes from reversing by using the first electric motor during a shift in the vehicular drive control apparatus. Accordingly, the possibility that an unpleasant sensation will be imparted on an occupant due to the direction in which the speed of the internal combustion engine changes reversing can be reduced.

In this case, a change in the speed of the internal combustion engine is preferably controlled by the first electric motor so that the direction in which the speed of the internal combustion engine changes will not reverse during a shift in the vehicular drive control apparatus. Accordingly, the possibility that an unpleasant sensation will be imparted on an occupant due to the direction in which the speed of the internal combustion engine changes reversing can be reduced.

According to the foregoing structure, the vehicular drive control apparatus includes a first electric motor and a second electric motor as the at least one electric motor, and the first electric motor is connected, so as to be able to transmit power, to a rotating element of the first transmitting portion. Also, when a shift is performed in the first transmitting portion at the same time that a shift is performed in the second transmitting portion and the direction in which the gear ratio of the first transmitting portion changes is opposite the direction in which the gear ratio of the second transmitting portion changes, the vehicular drive control apparatus controls the rotation speed of the first electric motor according to a change in an input rotation speed of the second transmitting portion. Therefore, the effect that a change in the input rotation speed of the second transmitting portion has on a shift in the first transmitting portion can be reduced by controlling the rotation speed of the first electric motor.

According to the foregoing structure, output torque of the internal combustion engine is reduced when the speed of the internal combustion engine is changing during the shift in the first transmitting portion. As a result, the effect that the internal combustion engine has on the shift in the first transmitting portion can be reduced. Also, when the first electric motor is connected to the first transmitting portion, the shift in the first transmitting portion can be easily controlled using the first transmitting portion.

Also, a second aspect of the invention relates to a method for controlling a vehicular drive apparatus that includes a first transmitting portion, a second transmitting portion, and at least one electric motor that is connected, so as to be able to transmit power, to a rotating element of the first transmitting portion or the second transmitting portion, the rotation speed of the rotating element changing as a shift in the first transmitting portion or the second transmitting portion progresses.

This control method includes controlling, when a shift is performed in the first transmitting portion at the same time that a shift is performed in the second transmitting portion and the direction in which a gear ratio of the first transmitting portion changes is opposite the direction in which the gear ratio of the second transmitting portion changes, the shift in one or both of the first transmitting portion and the second transmitting portion using the at least one electric motor such that the shift in one of the transmitting portions, from among the first transmitting portion and the second transmitting portion, ends while the shift in the other transmitting portion, from among the first transmitting portion and the second transmitting portion, is being performed.

In this case, the shifts in the first transmitting portion and the second transmitting portion may be stepped shifts.

Also, the first transmitting portion and the second transmitting portion may be provided with apply elements. The shift in the first transmitting portion may be performed by applying or releasing the apply element in the first transmitting portion, and the shift in the second transmitting portion may be performed by applying or releasing the apply element in the second transmitting portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a clutch and brake application chart showing various gears into which the power transmitting apparatus of the hybrid vehicle according to the first example embodiment shown in FIG. 1 is made to shift in either a continuously variable or stepped manner, together with various application and release combinations of hydraulic friction apply devices used to establish those gears;

FIG. 9 is a diagram showing an example of a shift operation executing apparatus which is provided with a shift lever and operated to select one of a plurality of various shift positions;

FIG. 13 is a clutch and brake application chart which corresponds to FIG. 2 and shows various gears into which the power transmitting apparatus of the hybrid vehicle shown in FIG. 12 is made to shift in either a continuously variable or stepped manner, together with various application and release combinations of hydraulic friction apply devices used to establish those gears.

DETAILED DESCRIPTION OF THE EMBODIMENTS

Example embodiments of the invention will now be described in detail with reference to the accompanying drawings. Although the vehicle to which the control apparatus of the invention is applied can be not limited to a hybrid vehicle, these example embodiment describes an example in which the control apparatus is applied to a hybrid vehicle.

First Example Embodiment

Figure 1:
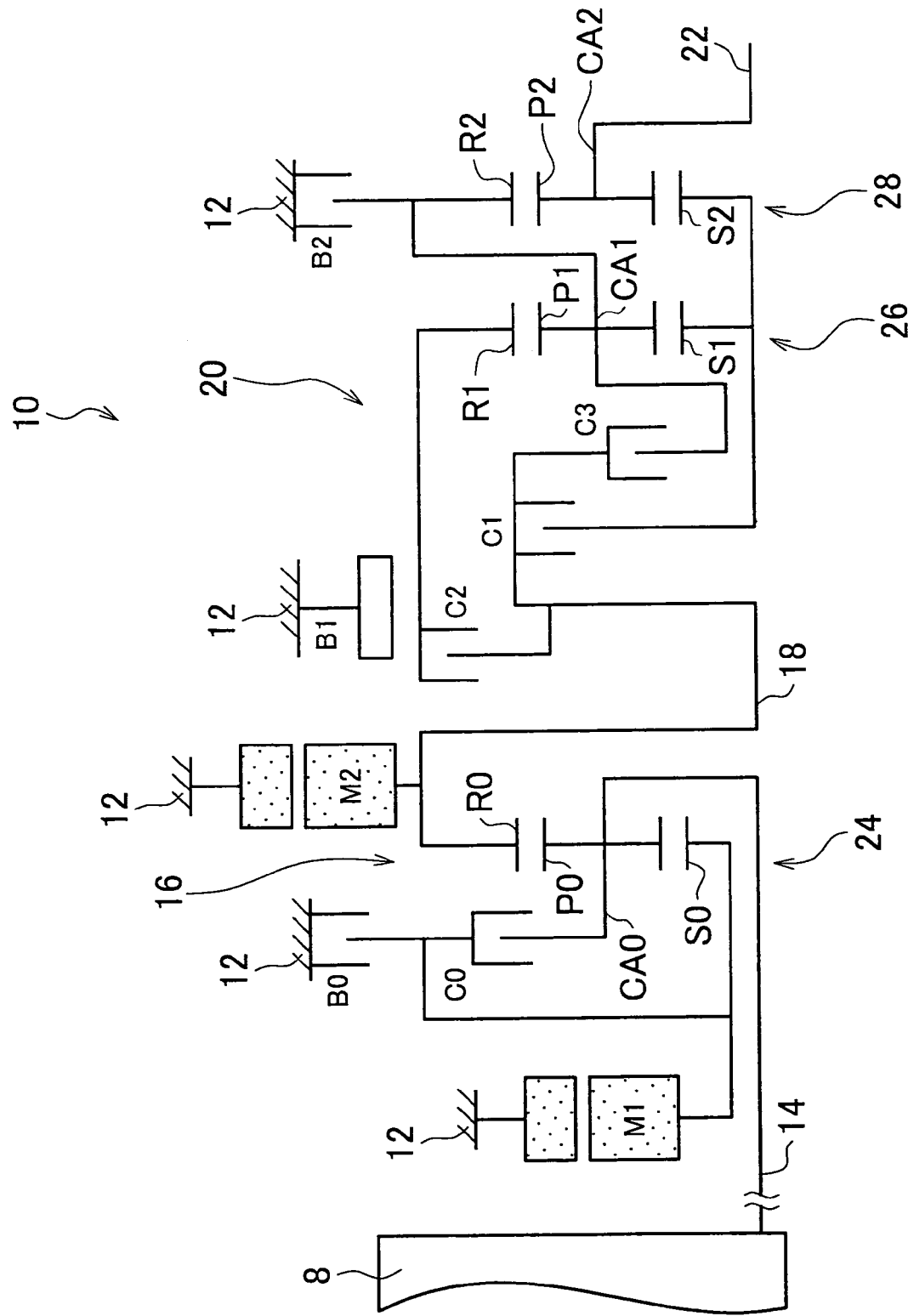
FIG. 1 is a skeleton view of the structure of a power transmitting apparatus of a hybrid vehicle according to a first example embodiment of the invention.
Figure 7:
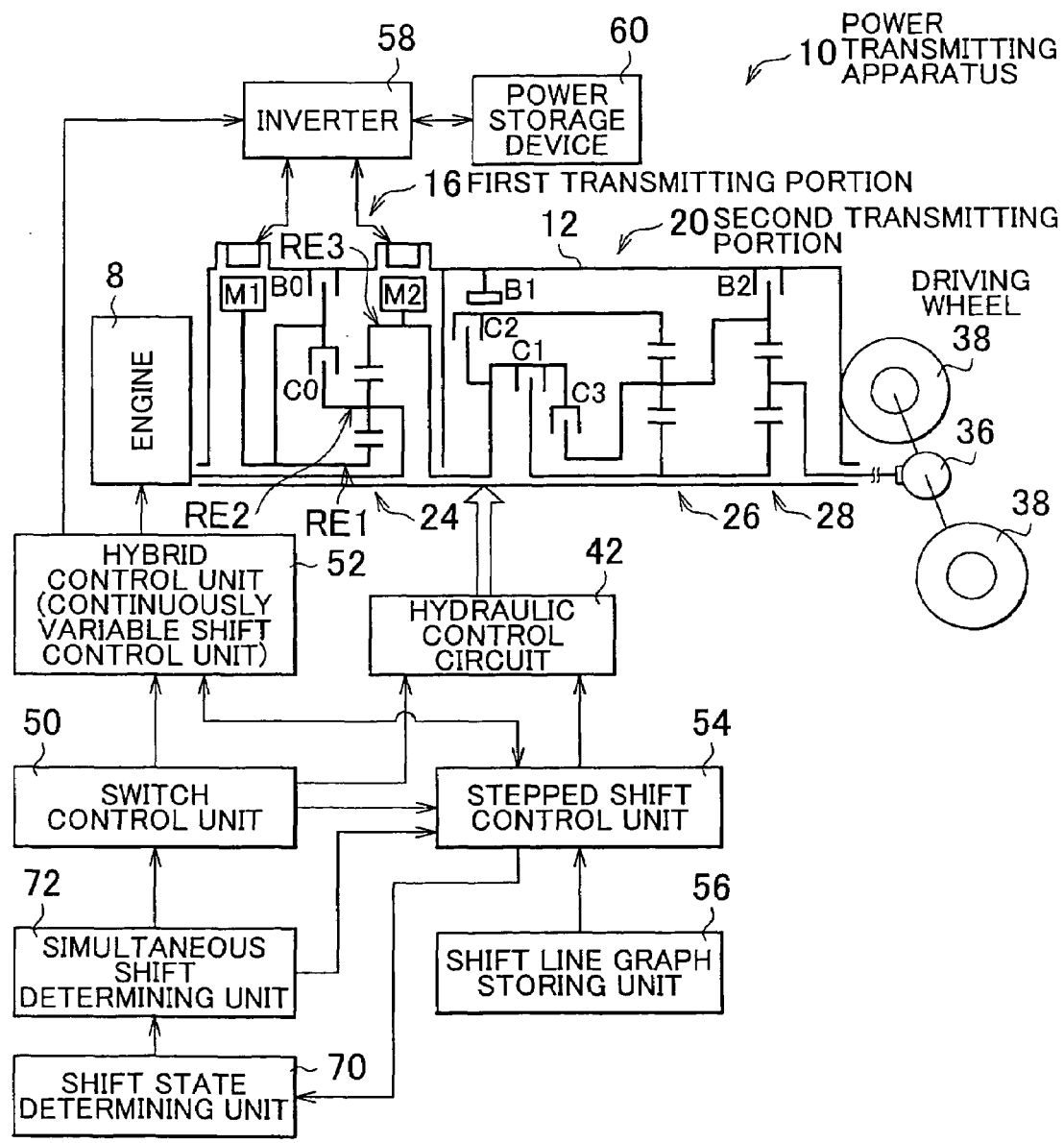
FIG. 7 is a functional block line diagram showing the main portions of a control operation of the electronic control apparatus shown in FIG. 6.

FIG. 1 is a skeleton view of a power transmitting apparatus 10 of a hybrid vehicle according to a first example embodiment of the invention. In FIG. 1, the power transmitting apparatus 10, which constitutes the vehicular drive control apparatus of the invention, includes an input shaft 14, a first transmitting portion 16, a second transmitting portion 20, and an output shaft 22, all of which are arranged in series on a common axis inside a transmission case 12 which is a non-rotating member that is attached to the vehicle body (hereinafter this transmission case 12 will simply be referred to as "case 12"). The input shaft 14 functions as an input member into which output from an engine 8 is input, and which is either directly connected to the engine 8 or indirectly connected to the engine 8 via a pulsation absorbing damper (i.e., a pulsation damping device), not shown, and the like. The first transmitting portion 16 functions as a differential mechanism that is connected to the input shaft 14. The second shifting portion 20 functions as a stepped shifting mechanism that is connected in series via a transmitting member (i.e., a transmitting shaft) 18 between the first transmitting portion 16 and the output shaft 22. The output shaft 22 functions as an output member that is connected to the second transmitting portion 20. The power transmitting apparatus 10 in this example embodiment is preferably used in a FR (front-engine, rear-drive) type vehicle in which it is longitudinally mounted in the vehicle. The power transmitting apparatus 10 is provided between the pair of driving wheels 38 and the engine 8 which is an internal combustion engine such as a gasoline engine or a diesel engine, or the like that serves as the driving power source for running the vehicle. This power transmitting apparatus 10 transmits power from the engine 8 to the pair of driving wheels 38 via a differential gear unit (final reduction device) 36 and a pair of axles and the like, in that order, as shown in FIG. 7. Incidentally, the power transmitting apparatus 10 has a symmetrical structure with respect to its axis so the lower portion of the power transmitting apparatus 10 is omitted in FIG. 1.

The first transmitting portion 16 is a differential mechanism that mechanically combines or distributes the output of the engine 8 that has been input to the input shaft 14, either distributing the output from the engine 8 to a first electric motor M1 and the transmitting member 18, or combining the output from the engine 8 with the output from the first electric motor M1 and outputting that combined output to the transmitting member 18. A second electric motor M2 is provided so that it rotates together with the transmitting member 18, though it may be provided anywhere between the transmitting member 18 and the output shaft 22. The first electric motor M1 and the second electric motor M2 in this example embodiment are both so-called motor-generators that can also function as generators. The first electric motor M1 at least functions as a generator (i.e., is capable of generating power) for generating reaction force, and the second generator M2 at least functions as a motor (i.e., an electric motor) that outputs driving force.

The first transmitting portion 16 has as its main components a single pinion type planetary gear set 24 having a predetermined gear ratio $\rho 0$ of approximately 0.380, for example, a switching clutch C0, and a switching brake B0. The planetary gear set 24 has a variety of rotating elements (i.e., elements) which are a sun gear S0, pinion gears P0, a carrier CA0 which rotatably and revolvably supports the pinion gears P0, and a ring gear R0 that is in mesh with the sun gear S0 via the pinion gears P0. When the number of teeth on the sun gear S0 is ZS0 and the number of teeth on the ring gear R0 is ZR0, the gear ratio $\rho 0$ is ZS0/ZR0.

In this first transmitting portion 16, the carrier CA0 is connected to the input shaft 14, i.e., the engine 8, the sun gear S0 is connected to the first electric motor M1, and the ring gear R0 is connected to the transmitting member 18. Also, the switching brake B0 is provided between the sun gear S0 and the transmission case 12, and the switching clutch C0 is provided between the sun gear S0 and the carrier CA0. When the switching clutch C0 and the switching brake B0 are released, the sun gear S0, the carrier CA0, and the ring gear R0 are able to rotate relative to one another, i.e., the first transmitting portion 16 is in a state in which differential operation is possible (hereinafter this state will be referred to as a "differential state"). Accordingly, the output from the engine 8 can be distributed to the first electric motor M1 and the transmitting member 18, with some of that distributed output from the engine 8 being used to run the first electric motor M1 to generate electric energy to be stored, as well as to run the second electric motor M2 to provide driving force. Accordingly, for example, the first transmitting portion 16 is placed in a so-called continuously variable shift state and the rotation of the transmitting member 18 can be continuously (i.e., in a stepless manner) changed regardless of the predetermined speed of the engine 8. That is, the first transmitting portion 16 is placed in the differential shift state in which its gear ratio $\gamma 0$ (the rotation speed of the input shaft 14 divided by the rotation speed of the transmitting member 18) can be electrically changed from a minimum value $\gamma 0 min$ to a maximum value $\gamma 0 max$, e.g., in a differential state such as a continuously variable shift state in which it functions as an electric continuously variable transmission in which its gear ratio γ0 can be continuously (i.e., in a stepless manner) changed from the minimum value γ0min to the maximum value γ0max.

In this state, when the switching clutch C0 is applied (i.e. switched to an applied state) while the vehicle is running using the output from the engine 8, the first transmitting portion 16 changes to a non-differential state in which the three elements S0, CA0, and R0 of the planetary gear set 24 are locked together and rotate together as a single unit such that the rotation speed of the engine 8 and the rotation speed of the transmitting member 18 are the same. As a result, the first transmitting portion 16 is placed in a fixed shift state in which it functions as a transmission in which the gear ratio γ0 is fixed at 1. Then, when the switching brake B0 is applied instead of the switching clutch C0, the first transmitting portion 16 is placed in a non-differential state in which the sun gear S0 is locked against rotation and the ring gear R0 rotates faster than the carrier CA0. As a result, the first transmitting portion 16 is placed in a fixed shift state in which it functions as a speed increasing transmission in which the gear ratio γ0 is fixed at a value less than 1, such as approximately 0.7, for example. In this way, the switching clutch C0 and the switching brake B0 function as differential state switching devices that selectively switch the shift state of the first transmitting portion 16 between a differential state (i.e., a continuously variable shift state) and a non-differential state (i.e., a fixed shift state or non-continuously variable shift state). The differential state is, for example, a state in which the first transmitting portion 16 is able to operate as an electric continuously variable transmission that can continuously change the gear ratio. On the other hand, the non-differential state is, for example, a locked state in which the first transmitting portion 16 does not operate as an electric continuously variable transmission so a continuously variable shift operation is not performed. Instead, the gear ratio is locked (fixed) so that it will not change. That is, in the non-differential state the first transmitting portion 16 is able to operate as a single or multi-speed transmission with one or two types of gear ratio sets.

The second transmitting portion 20 includes a single pinion type first planetary gear set 26 and a single pinion type second planetary gear set 28. The first planetary gear set 26 includes a first sun gear S1, first pinion gears P1, a first carrier CA1 which rotatably and revolvably supports the first pinion gears P1, and a first ring gear R1 that is in mesh with the first sun gear S1 via the first pinion gears P1, and has a predetermined gear ratio ρ1 of approximately 0.529, for example. The second planetary gear set 28 includes a second sun gear S2, second pinion gears P2, a second carrier CA2 which rotatably and revolvably supports the second pinion gears P2, and a second ring gear R2 that is in mesh with the second sun gear S2 via the second pinion gears P2, and has a predetermined gear ratio ρ2 of approximately 0.372, for example. When the number of teeth on the first sun gear S1 is ZS1, the number of the teeth on the first ring gear R1 is ZR1, the number of teeth on the second sun gear S2 is ZS2, and the number of teeth on the second ring gear R2 is ZR2, the gear ratio ρ1 is ZS1/ZR1 and the gear ratio ρ2 is ZS2/ZR2.

In the second transmitting portion 20, the first sun gear S1 and the second sun gear S2 are integrally connected together as well as selectively connected to the transmitting member 18 via a first clutch C1. The first carrier CA1 and the second ring gear R2 are integrally connected together as well as selectively connected to the transmitting member 18 via a third clutch C3 and selectively connected to the case 12 via a second brake B2. The first ring gear R1 is selectively connected to the transmitting member 18 via a second clutch C2 and selectively connected to the case 12 via a first brake B1. The second carrier CA2 is connected to the output shaft 22.

The switching clutch C0, the first clutch C1, the second clutch C2, the third clutch C3, the switching brake B0, the first brake B1, and the second brake B2 are hydraulic friction apply devices that are often used in conventional vehicular automatic transmissions. With the exception of the first brake B1, these apply devices are wet type multiple disc apply devices in which a plurality of stacked friction plates are pressed together by a hydraulic actuator. The first brake B1, on the other hand, is a band brake in which one end of one or two bands that are wound around the outer peripheral surface of a rotating drum is pulled tight by a hydraulic actuator, thereby selectively connecting the members on both sides of the band(s).

In the power transmitting apparatus 10 structured as described above, any gear from first gear to seventh gear (in this specification these gears may also be referred to as "1st gear", "2nd gear", "3rd gear", . . . "7th gear"), reverse (i.e., reverse gear), or neutral may be selectively established by selectively applying the switching clutch C0, the first clutch C1, the second clutch C2, the third clutch C3, the switching brake B0, the first brake B1, and the second brake B2 in the combinations shown in the clutch and brake application chart in FIG. 2, for example. A gear ratio γ (=input shaft rotation speed $N_{IN}$/output shaft rotation speed $N_{OUT}$) that changes in substantially equal ratio is obtained for each forward gear. In this example embodiment, the first transmitting portion 16 is provided with the switching clutch C0 and the switching brake B0. As a result, in addition to a continuously variable shift state in which it operates as a continuously variable transmission as described above, the first transmitting portion 16 can also be placed in a fixed shift state, in which it operates as a single or multi-speed transmission with one or two or more types of gear ratio sets, by applying either the switching clutch C0 or the switching brake B0. Therefore, the power transmitting apparatus 10 can be made to operate as a stepped transmission by the first transmitting portion 16 and the second transmitting portion 20 when they have been placed in the fixed shift state by applying either the switching clutch C0 or the switching brake B0, as well as made to operate as a continuously variable transmission by the first transmitting portion 16 and the second transmitting portion 20 when they have been placed in the continuously variable shift state by not applying the switching clutch C0 or the switching brake B0.

For example, when the power transmitting apparatus 10 is made to operate as a stepped transmission, various gears can be established as shown in FIG. 2. More specifically, first gear which has the largest gear ratio γ1, e.g., 3.683, can be established by applying the switching clutch C0, the first clutch C1, and the second brake B2. Second gear which has a gear ratio γ2 smaller than that of first gear, e.g., 2.669, can be established by applying the switching brake B0, the first clutch C1, and the second brake B2. Third gear which has a gear ratio γ3 smaller than that of second gear, e.g., 1.909, can be established by applying the switching clutch C0, the first clutch C1, and the first brake B1. Fourth gear which has a gear ratio γ4 smaller than that of third gear, e.g., 1.383, can be established by applying the switching brake B0, the first clutch C1, and the first brake B1. Fifth gear which has a gear ratio γ5 smaller than that of fourth gear, e.g., 1.000, can be established by applying the switching clutch C0, the first clutch C1, and the third clutch C3. Sixth gear which has a gear ratio γ6 smaller than that of fifth gear, e.g., 0.661, can be established by applying the switching clutch C0, the third clutch C3, and the first brake B1. Seventh gear which has a gear ratio γ7 smaller than that of sixth gear, e.g., 0.479, can be established by applying the switching brake B0, the third clutch C3, and the first brake B1. Also, reverse which is used during either engine-running or motor-running and which has a gear ratio γR between that of second gear and that of third gear, e.g., 1.951, can be established by applying either the first clutch C1 or the second clutch C2, and the second brake B2. Also, when the power transmitting apparatus 10 is in neutral "N", only the second brake B2, for example, is applied.

In the description above, the gear ratios of adjacent gears are changed in equal ratio which is ideal for stepped shifting, and the change ratios between gears (i.e., the gear ratio step) are substantially constant. That is, the change ratio (γ1/γ2) of the gear ratio between first gear and second gear is 1.380, the change ratio (γ2/γ3) of the gear ratio between second gear and third gear is 1.398, the change ratio (γ3/γ4) of the gear ratio between third gear and fourth gear is 1.380, the change ratio (γ4/γ5) of the gear ratio between fourth gear and fifth gear is 1.383, the change ratio (γ5/γ6) of the gear ratio between fifth gear and sixth gear is 1.383, and the change ratio (γ6/γ7) of the gear ratio between sixth gear and seventh gear is 1.380. The total gear ratio width (γ1/γ7) is set to a substantially large value of 7.687.

However, when the power transmitting apparatus 10 functions as a continuously variable transmission, both the switching clutch C0 and the switching brake B0 are released as shown in the clutch and brake application chart in FIG. 2. As a result, the first transmitting portion 16 functions as a continuously variable transmission and the second transmitting portion 20 that is connected in series with the first transmitting portion 16 functions as a four-speed stepped transmission so the rotation speed that is input to the second transmitting portion 20, i.e., the rotation speed of the transmitting member 18, for each of the four gears, i.e., 1st, 3rd, 5th, and 6th, of the second transmitting portion 20 shown in the clutch and brake application chart in FIG. 2 can be changed continuously such that each gear has a continuous gear ratio width. Accordingly, there is a continuously variable gear ratio between each gear, thereby enabling the total gear ratio γT of the overall power transmitting apparatus 10 to be obtained in a continuous (i.e., stepless) manner.

Figure 3:
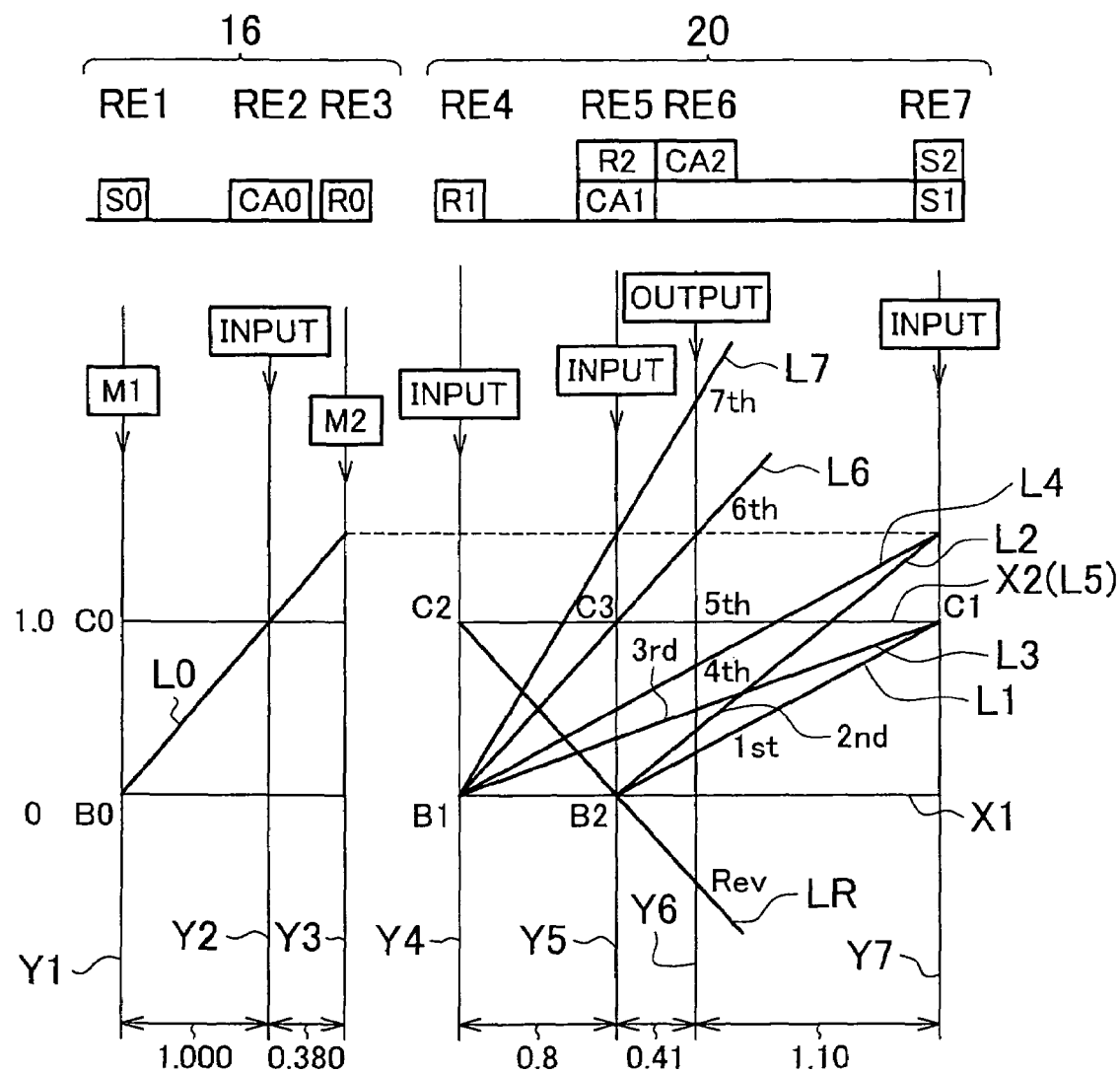
FIG. 3 is an alignment graph illustrating the relative rotation speeds in each gear when the power transmitting apparatus of the hybrid vehicle according to the first example embodiment shown in FIG. 1 is made to shift gears in a stepped manner.

FIG. 3 is an alignment graph which shows the relationships, on straight lines, among the rotation speeds of the various rotating elements that are in different connective states in each gear in the power transmitting apparatus 10 that includes the first transmitting portion 16 which functions as a continuously variable transmitting portion and the second transmitting portion 20 which functions as a stepped transmitting portion. The alignment graph in FIG. 3 is a two-dimension coordinate system having a horizontal axis that represents the relationships among the gear ratios ρ of the planetary gear sets 24, 26, and 28, and a vertical axis that represents the relative rotation speeds. Of the two horizontal lines, the lower horizontal line X1 represents a rotation speed of zero, and the upper horizontal line X2 represents a rotation speed of 1.0, i.e., the rotation speed $N_E$ of the engine 8 that is connected to the input shaft 14. Also, the three vertical lines Y1, Y2, and Y3 of the first transmitting portion 16 represent, in order from left to right, the relative rotation speeds of the sun gear S0 corresponding to a first rotating element (first element) RE1, the carrier CA0 corresponding to a second rotating element (second element) RE2, and the ring gear R0 corresponding to a third rotating element (third element) RE3. The intervals between the vertical lines Y1, Y2, and Y3 are determined by the gear ratio ρ0 of the planetary gear set 24. That is, when the interval between the vertical lines Y1 and Y2 corresponds to 1, then the interval between the vertical lines Y2 and Y3 corresponds to the gear ratio ρ0. Further, the four vertical lines Y4, Y5, Y6, and Y7 of the second transmitting portion 20 represent, in order from left to right, the first ring gear R1 corresponding to a fourth rotating element (fourth element) RE4, the first carrier CA1 and the second ring gear R2 which are connected together and correspond to a fifth rotating element (fifth element) RE5, the second carrier CA2 corresponding to a sixth rotating element (sixth element) RE6, and the first sun gear S1 and the second sun gear S2 which are connected together and correspond to a seventh rotating element (seventh element) RE7. The intervals between the vertical lines Y4, Y5, Y6, and Y7 are determined according to the gear ratio ρ1 of the first planetary gear set 26 and the gear ratio ρ2 of the second planetary gear set 28. That is, when the interval between the sun gear and the carrier in both the first and second planetary gear sets 26 and 28 is 1, then the interval between the carrier and the ring gear is an interval corresponding to the gear ratio ρ.

When expressed using the alignment graph in FIG. 3, the power transmitting apparatus 10 in this example embodiment is structured such that in the first transmitting portion (i.e., the continuously variable transmitting portion) 16, the second rotating element RE2 (i.e., the carrier CA0) which is one of the three rotating elements (i.e., elements) of the planetary gear set 24 is connected to the input shaft 14 as well as selectively connected to the first rotating element RE1 (i.e., the sun gear S0) via the switching clutch C0, the first rotating element RE1 (i.e., the sun gear S0) which is another one of the three rotating elements of the planetary gear set 24 is connected to the first electric motor M1 as well as selectively connected to the case 12 via the switching brake B0, and the third rotating element RE3 (i.e., the ring gear R0) which is the remaining of the three rotating elements of the planetary gear set 24 is connected to both the transmitting member 18 and the second electric motor M2 such that the rotation of the input shaft 14 is transmitted (input) to the second transmitting portion 20 via the transmitting member 18. At this time, the relationship between the rotation speed of the sun gear S0 and the rotation speed of the ring gear R0 is shown by the sloped straight line L0 passing through the point of intersection of Y2 and X2.

In the alignment graph in FIG. 3, the alignment graph of the first transmitting portion 16 shown by the three vertical lines Y1, Y2, and Y3 on the left illustrates a fixed shift state in which the first transmitting portion 16 functions as a speed increasing transmission by applying the switching brake B0. In this case, if the first sun gear S1 is held against rotation by applying the switching brake B0, the straight line L0 becomes as shown in FIG. 3 such that the rotation speed of the ring gear R0 represented by the point of intersection of the straight line L0 and the vertical line Y3, i.e., the rotation speed of the transmitting member 18, is input to the second transmitting portion 20 at a speed that is faster than the engine speed $N_E$.

Figure 4:
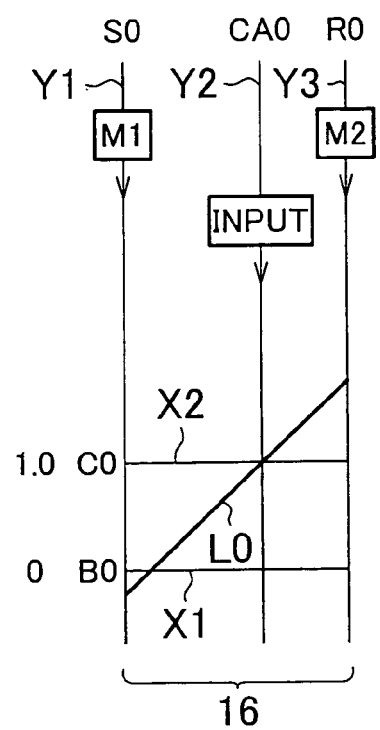
FIG. 4 is an alignment graph which corresponds to the portion of the first transmitting portion in the alignment graph in FIG. 3 and shows an example of the state of the first transmitting portion when it is switched to the continuously variable shift state.

FIG. 4 shows the state of the first transmitting portion 16 when it is switched to the continuously variable shift state by releasing the switching clutch C0 and the switching brake B0. For example, if the rotation speed of the sun gear S0 represented by the point of intersection of the straight line L0 and the vertical line Y1 is increased or decreased by controlling the reaction force by generating power with the first electric motor M1, the rotation speed of the ring gear R0 which is represented by the point of intersection of the straight line L0 and the vertical line Y3 is continuously decreased or increased so rotation will be input to the second transmitting portion 20 at a speed that has been changed in this continuous (i.e., stepless) manner.

Figure 5:
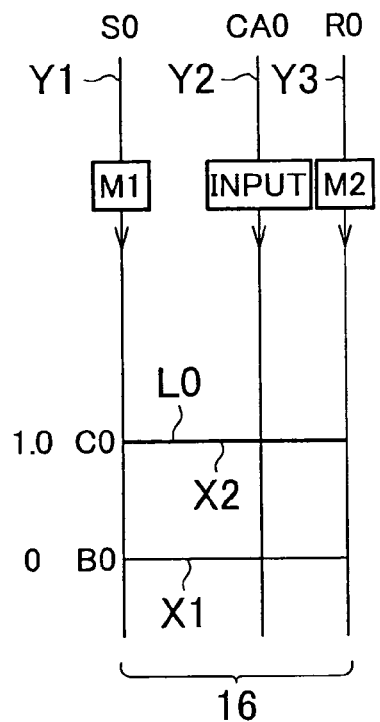
FIG. 5 is an alignment graph which corresponds to the portion with the first transmitting portion and shows the state of the first transmitting portion when it has been switched to the stepped shift state by applying a switching clutch.

FIG. 5 is an alignment graph which corresponds to the portion with the first transmitting portion 16 and shows the state of the first transmitting portion 16 when it has been switched to the fixed shift state with a gear ratio of 1 by applying the switching clutch C0. When the sun gear S0 and the carrier CA0 are connected together by applying the switching clutch C0, all three rotating elements rotate together as a single unit. Therefore, the straight line L0 will match the horizontal line X2, and the transmitting member 18 will rotate at the same speed as the engine speed $N_E$ so rotation will be input to the second transmitting portion 20 at the same speed as the engine speed $N_E$.

Also, in the second transmitting portion 20, the fourth rotating element RE4 (R1) is selectively connected to the transmitting member 18 via the second clutch C2, as well as selectively connected to the case 12 via the first brake B1. The fifth rotating element RE5 (CA1 and R2) is selectively connected to the transmitting member 18 via the third clutch C3, as well as selectively connected to the case 12 via the second brake B2. The sixth rotating element RE6 (CA2) is connected to the output shaft 22, and the seventh rotating element RE7 (S1 and S2) is selectively connected to the transmitting member 18 via the first clutch C1.

As shown in FIG. 3, in the second transmitting portion 20, the rotation speed of the output shaft 22 in first gear, which is established by applying the first clutch C1 and the second brake B2 while the switching clutch C0 is applied, is shown at the point of intersection of i) the sloped straight line L1 that passes through both the point of intersection of the horizontal line X2 and the vertical line Y7 that represents the rotation speed of the seventh rotating element RE7 and the point of intersection of the horizontal line X1 and the vertical line Y5 that represents the rotation speed of the fifth rotating element RE5, and ii) the vertical line Y6 that represents the rotation speed of the sixth rotating element RE6 that is connected to the output shaft 22. Similarly, the rotation speed of the output shaft 22 in second gear, which is established by applying the first clutch C1 and the second brake B2 while switching brake B0 is applied, is shown at the point of intersection of the sloped straight line L2 and the vertical line Y6 that represents the rotation speed of the sixth rotating element RE6 that is connected to the output shaft 22. Also, the rotation speed of the output shaft 22 in third gear, which is established by applying the first clutch C1 and the first brake B1 while the switching clutch C0 is applied, is shown at the point of intersection of the sloped straight line L3 and the vertical line Y6 that represents the rotation speed of the sixth rotating element RE6 that is connected to the output shaft 22. Similarly, the rotation speed of the output shaft 22 in fourth gear, which is established by applying the first clutch C1 and the first brake B1 while switching brake B0 is applied, is shown at the point of intersection of the sloped straight line L4 and the vertical line Y6 that represents the rotation speed of the sixth rotating element RE6 that is connected to the output shaft 22. Also, the rotation speed of the output shaft 22 in fifth gear, which is established by applying the first clutch C1 and the third clutch C3 while switching clutch C0 is applied, is shown at the point of intersection of the horizontal straight line L5 (=X2) and the vertical line Y6 that represents the rotation speed of the sixth rotating element RE6 that is connected to the output shaft 22. Similarly, the rotation speed of the output shaft 22 in sixth gear, which is established by applying the first brake B1 and the third clutch C3 while the switching clutch C0 is applied, is shown at the point of intersection of the sloped straight line L6 and the vertical line Y6 that represents the rotation speed of the sixth rotating element RE6 that is connected to the output shaft 22. Similarly, the rotation speed of the output shaft 22 in seventh gear, which is established by applying the third clutch C3 and the first brake B1 while the switching brake B0 is applied, is shown at the point of intersection of the sloped straight line L7 and the vertical line Y6 that represents the rotation speed of the sixth rotating element RE6 that is connected to the output shaft 22.

Figure 6:
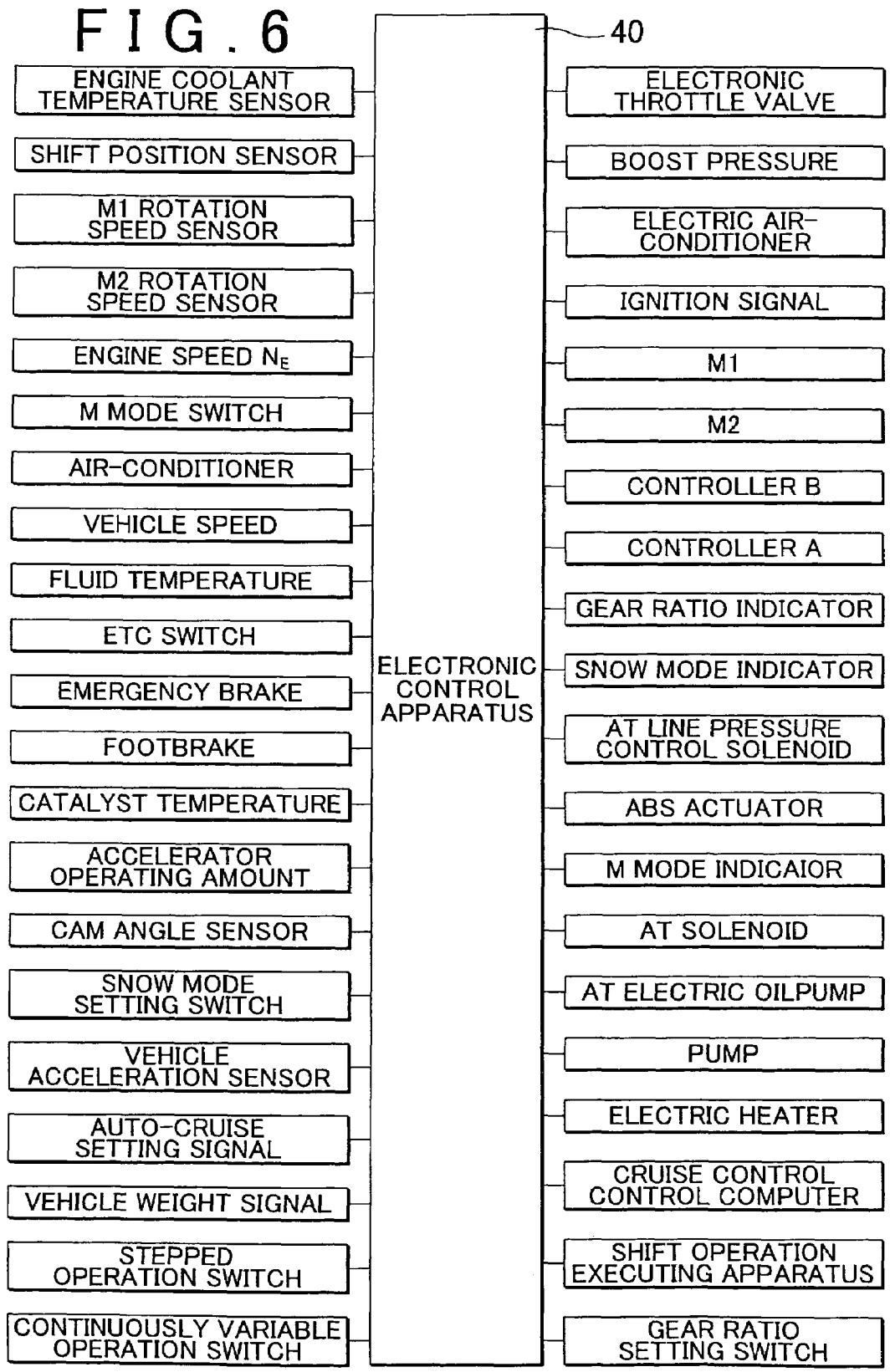
FIG. 6 is a view showing input and output signals of an electronic control apparatus provided in the power transmitting apparatus in the first example embodiment shown in FIG. 1.

FIG. 6 shows an example of signals received by and output from an electronic control apparatus 40 which is the control apparatus that controls the power transmitting apparatus 10 in this example embodiment. This electronic control apparatus 40 includes a so-called microcomputer that includes a CPU, ROM, RAM, and input/output interfaces and the like. The electronic control apparatus 40 executes drive control, such as shift control of the second transmitting portion 20 and hybrid drive control related to the engine 8 and the first and second electric motors M1 and M2, by processing those signals according to programs stored in advance in the ROM while using the temporary storage function of the RAM.

Various signals are input to this electronic control apparatus 40 from various sensors and switches and the like, as shown in FIG. 6. Among these signals are a signal indicative of the engine coolant temperature, a signal indicative of a shift position, a signal indicative of the engine speed $N_E$ which is the speed of the engine 8, a signal indicative of a gear ratio setting value, a signal indicative of a command to operate in a M mode (manual shift running mode), an air-conditioner signal indicative of operation of an air-conditioner, a vehicle speed signal indicative of the rotation speed of the output shaft 22, a hydraulic fluid temperature signal indicative of the temperature of the hydraulic fluid in the second transmitting portion 20, a signal indicative of an emergency brake operation, a signal indicative of a footbrake operation, a catalyst temperature signal indicative of the catalyst temperature, and an accelerator operating amount signal indicative of the operating (i.e., depression) amount of an accelerator pedal. Other signals received by the electronic control apparatus 40 include a cam angle signal, a snow mode setting signal indicative of a snow mode setting, an acceleration signal indicative of the longitudinal acceleration of the vehicle, an auto-cruise signal indicative of auto-cruise running, a vehicle weight signal indicative of the vehicle weight, wheel speed signals indicative of the wheel speed of each wheel, a signal indicative of operation of a stepped-operation switch for switching the first transmitting portion 16 to a fixed shift state in order to make the power transmitting apparatus 10 function as a stepped transmission, a signal indicative of operation of a continuously-variable-operation switch for switching the first transmitting portion 16 to a continuously variable shift state in order to make the power transmitting apparatus 10 function as a continuously variable transmission, a signal indicative of the rotation speed $N_{M1}$ of the first electric motor M1 (hereinafter simply referred to as "first electric motor rotation speed $N_{M1}$"), a signal indicative of the rotation speed $N_{M2}$ of the second electric motor M2 (hereinafter simply referred to as "second electric motor rotation speed $N_{M2}$"), and a signal indicative of the shift position from the shift operation executing apparatus 46, and the like. The electronic control apparatus 40 also outputs various signals. Among these signals are a drive signal to a throttle actuator that controls the opening amount of a throttle valve, a pressure boost adjusting signal for adjusting the boost pressure, an electric air-conditioner drive signal for operating an electric air-conditioner, an ignition signal that dictates the ignition timing of the engine 8, and command signals indicative of commands to operate the first and second electric motors M1 and M2. Other signals output from the electronic control apparatus 40 include a shift position (operating position) indication signal for operating a shift indicator, a gear ratio indication signal for indicating the gear ratio, a snow mode indication signal for indicating when the vehicle is being operated in the snow mode, an ABS activation signal to activate an ABS actuator that prevents the wheels from slipping during braking, an M mode indication signal that indicates that the M mode has been selected, valve command signals that operate electromagnetic valves in the hydraulic control circuit 42 for controlling hydraulic actuators of the hydraulic friction apply devices in the first transmitting portion 16 and the second transmitting portion 20, a drive command signal for operating an electric hydraulic pump which is the source of hydraulic pressure in the hydraulic control circuit 42, a signal for driving an electric heater, and a signal that is output to a computer for controlling cruise control, and the like.

FIG. 7 is a functional block line diagram showing the method for controlling the power transmitting apparatus 10, i.e., the main portions of the control functions of the electronic control apparatus 40. A switch control unit 50 determines whether the vehicle state indicated by the vehicle speed V and the output torque $T_{OUT}$ is in i) a continuously variable control region in which the power transmitting apparatus 10 should be operated in the continuously variable shift state, ii) a stepped control region in which the power transmitting apparatus 10 should be operated in the stepped shift state, or iii) a motor running region, based on a value related to the driving force which is related to the driving force of the hybrid vehicle such as the output torque $T_{OUT}$, and the actual vehicle speed V from a relationship (i.e., shift map), shown in FIG. 8, which is stored in the shift line graph storing unit 56 beforehand, for example. If it is determined that the vehicle state is in the stepped control region, the switch control unit 50 outputs a signal to disallow (i.e., prohibit) hybrid control or continuously variable shift control to the hybrid control unit 52 which serves as a continuously variable shift control unit. At the same time, the switch control unit 50 also outputs a signal that allows shift control for a stepped shift that was set in advance to the stepped shift control unit 54. The stepped shift control unit 54 at this time executes automatic shift control according to a shift line graph, not shown, stored in advance in the shift line graph storing unit 56.

The value related to the driving force is a parameter that corresponds one-to-one with the driving force of the vehicle, and may be a value of not only the drive torque or the driving force at the driving wheels 38, but also, for example, the output torque $T_{OUT}$ of the second transmitting portion 20, the output torque $T_E$ of the engine 8 (hereinafter referred to as "engine torque $T_E$"), the vehicle acceleration, an actual value of the engine torque $T_E$ which is calculated based on the accelerator operating amount or the throttle opening amount (or the intake air amount, the air-fuel ratio, or the fuel injection quantity) and the engine speed $N_E$, for example, or an estimated value of the required driving force or the engine torque $T_E$ which is calculated based on the accelerator pedal operating amount by the driver or the throttle opening amount, which is has a one-to-one relation with that drive torque or driving force.

However, when it has been determined that the vehicle state as indicated by the vehicle speed V and the output torque $T_{OUT}$ is in the continuously variable control region, the switch control unit 50 outputs a command to the hydraulic control circuit 42 to release both the switching clutch C0 and the switching brake B0 so that the first transmitting portion 16 is able to electrically shift continuously. At the same time, the switch control unit 50 also outputs a signal to the hybrid control unit 52 to allow hybrid control, as well as outputs to the stepped shift control unit 54 a signal to allow automatic shifting according to the shift line graph shown in FIG. 8, which is preset. In this case, the stepped shift control unit 54 performs automatic shifting by an operation that excludes the application of the switching clutch C0 and the switching brake B0 in the clutch and brake application chart shown in FIG. 2. In this way, by having the first transmitting portion 16 operate as a continuously variable transmission and having the second transmitting portion 20 which is in-line with the first transmitting portion 16 operate as a stepped transmission, an appropriately large driving force can be obtained while a continuous gear ratio width can be obtained for each gear by changing the rotation speed input to the second transmitting portion 20, i.e., the rotation speed of the transmitting member 18, continuously (i.e., in a stepless manner) for first through fourth gear in the second transmitting portion 20 as described above. Accordingly, the intervals between those gears are gear ratios that can be changed continuously (i.e., in a stepless manner) such that the total gear ratio γT can be obtained continuously in the overall power transmitting apparatus 10.

When the vehicle speed is relatively low and the load is relatively light, such as during a normal takeoff, the hybrid control unit 52 executes motor running using the second electric motor M2 as the driving source. Also, when the vehicle is running at normal speed and normal load, the hybrid control unit 52 operates the engine 8 in an efficient operating range and optimizes the distribution of driving force between the engine 8 and the first electric motor M1 and/or the second electric motor M2. For example, at running speed at this time, the hybrid control unit 52 calculates the output required by the driver from the accelerator pedal operating amount and the vehicle speed, calculates the required driving force from the output required by the driver and the charging required value, and calculates the engine speed and the total output. Then the hybrid control unit 52 controls the engine and the amount of power generated by the first electric motor M1 to obtain the engine output based on that total output and the engine speed $N_E$. The hybrid control unit 52 executes that control taking into account the gear of the second transmitting portion 20, or outputs a shift command to the second transmitting portion 20 to improve fuel efficiency. In this kind of hybrid control, the first transmitting portion 16 is made to operate as an electric continuously variable transmission in order to match the engine speed $N_E$ that is set so that the engine 8 operates in an efficient operating range and the rotation speed of the transmitting member 18 that is determined by the vehicle speed and the gear of the second transmitting portion 20. That is, the hybrid control unit 52 controls the engine 8 so that it operates along the optimum fuel efficiency curve stored beforehand in order to achieve both drivability and fuel efficiency during continuously variable shift running. For example, the hybrid control unit 52 determines the target value of the total speed ratio γT of the power transmitting apparatus 10 and controls the gear ratio γ0 of the first transmitting portion 16 to obtain that target value, and controls the total speed ratio γT within the range through which shifting is possible, such as a range from 13 to 0.5, for example.

At this time, the hybrid control unit 52 supplies electric energy generated by the first electric motor M1 to the second electric motor M2 and a power storage device 60 via an inverter 58. Accordingly, most of the power from the engine 8 is mechanically transmitted to the transmitting member 18. However, some of the power from the engine 8 is used (i.e., consumed) to generate power with the first electric motor M1 where it is converted into electric energy. This electric energy is then supplied via the inverter 58 to the second electric motor M2 or the first electric motor M1, where it is used to drive the second electric motor M2 or the first electric motor M1 in order to generate power which is then transmitted to the transmitting member 18. The equipment related to the process from the generation of this electric energy until that electric energy is consumed by the second electric motor M2 or the first electric motor M1 converts some of the power from the engine 8 into electric energy and provides an electrical path for that electric energy until it is converted into mechanical energy. Also, the hybrid control unit 52 can execute motor running using the electric CVT function of the first transmitting portion 16, regardless of whether the engine 8 is stopped or idling.

Figure 8:
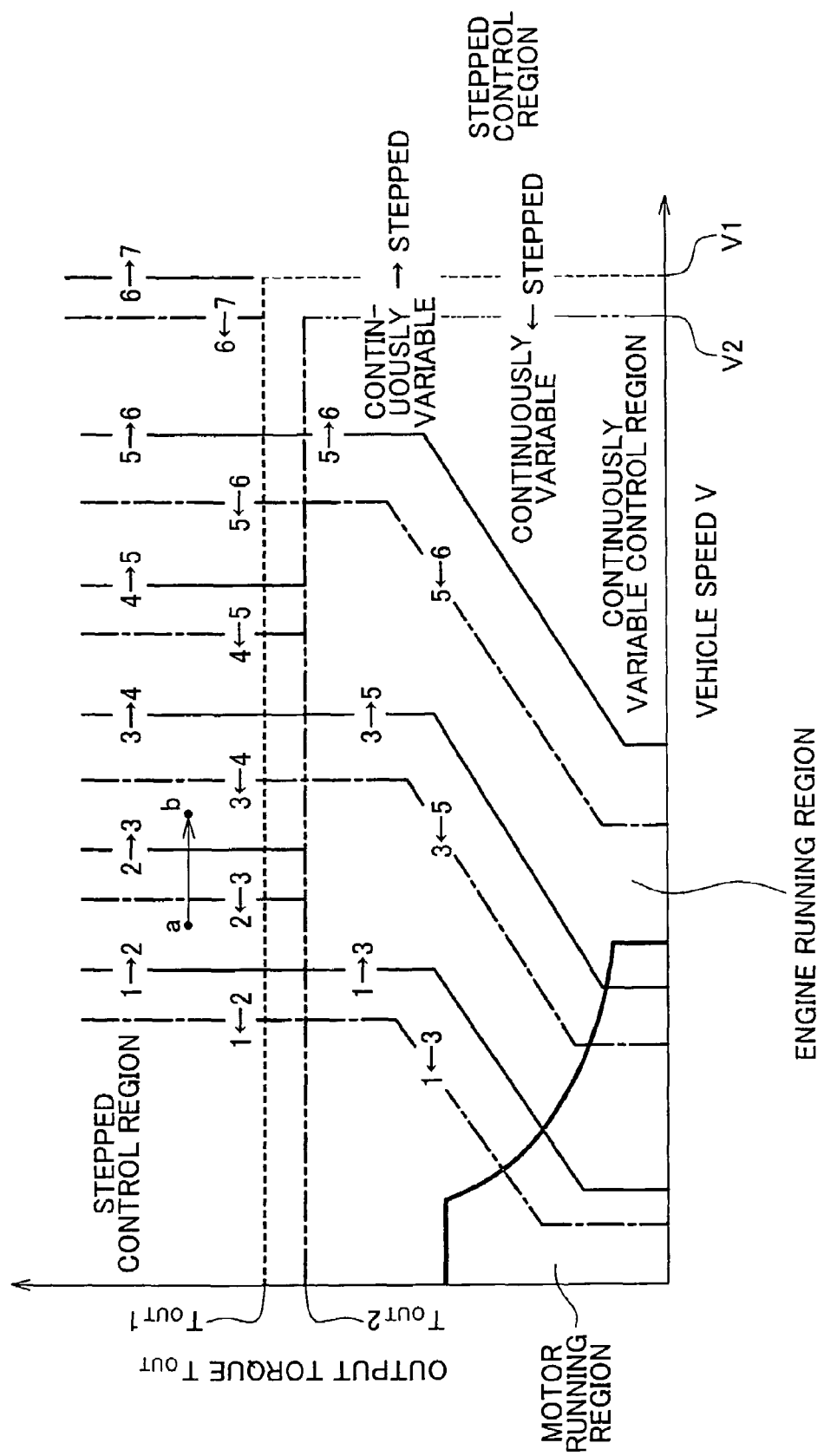
FIG. 8 is a graph showing the relationship between a continuously variable control region and a stepped control region, which is used in switching control in a switching control unit shown in FIG. 7 and stored beforehand.

FIG. 8 is one example of a shift line graph (relationship) which is stored in advance in the shift line graph storing unit 56 and provides the basis for the shift determinations of the second transmitting portion 20. This shift line graph (i.e., shift map) is formed by a two-dimensional coordinate system having the vehicle speed V and the output torque $T_{OUT}$ which is a value related to the driving force as parameters. The bold line, which indicates a low vehicle speed and a low load, in FIG. 8 represents the motor running region. The solid lines in FIG. 8 are upshift lines and the alternate long and short dashes lines are downshift lines. The broken line in FIG. 8 represents a determining vehicle speed V1 and a determining output torque $T_{OUT}1$ for making a determination to switch between the continuously variable control region and the stepped control region by the switch control unit 50. The broken line in FIG. 8 is both a high vehicle speed determination line and a high output running determination line. The high vehicle speed determination line defines the range of the determining vehicle speed V1 which is a high speed running determining value. The high output running determination line defines the range of the determining output torque $T_{OUT}1$ which is a high output running determining value. Also, in the continuously variable control region in FIG. 8, the upshift and downshift lines cover only four forward gears, skipping from first gear to third gear to fifth gear to sixth gear. In contrast, in the stepped control region, the upshift and downshift lines cover seven forward gears from first gear to seventh gear. Moreover, there is hysteresis in the determination between the stepped control region and the continuously variable control region, as shown by the alternate long and two short dashes line with respect to the broken line in FIG. 8. That is, the determining output torque $T_{OUT}2$ is a value for determining that the output torque $T_{OUT}$ is in the normal torque region (i.e., the normal output running region) when it is equal to or below that line, and is set a predetermined value lower than the determining output torque $T_{OUT}1$ in order to create hysteresis to prevent the determination from switching back and forth. Also, the determining vehicle speed V2 is a value for determining that the vehicle speed V is in the normal vehicle speed region (i.e., the normal vehicle speed running region) when it is equal to or below that line, and is set a predetermined value lower than the determining vehicle speed V1 in order to create hysteresis to prevent the determination from switching back and forth.

As shown by the relationships in FIG. 8, the high torque region (i.e., the high output running region) where the output torque $T_{OUT}$ is equal to or greater than the determining output torque $T_{OUT}1$ which is set in advance, the high vehicle speed region where the vehicle speed V is equal to or greater than the determining vehicle speed V1 which is set in advance, i.e., the high vehicle speed region where the vehicle speed which is one indicator of the vehicle state uniquely determined by the engine speed $N_E$ and the total gear ratio γT is equal to or greater than a predetermined value, or the high output region where the output calculated from the output torque $T_E$ of the engine 8 and the total gear ratio γT is equal to or greater than a predetermined value, is set as the stepped control region. Therefore, stepped shift control according to the shift lines shown in FIG. 8 is executed when the output torque, the speed, or the output of the engine 8 is relatively high. On the other hand, continuously variable shift control is executed when the output torque, the speed, or the output of the engine 8 is relatively low, i.e., in the normal output range of the engine 8.

FIG. 9 shows one example of a shift operation executing apparatus 46 which is a manual shift operation executing device. This shift operation executing apparatus 46 is provided with a shift lever 48 that is arranged at the side of the driver's seat, for example, and is operated to select any one of the plurality of various shift positions. This shift lever 48 is provided so as to be manually operated (i.e., shifted) into various positions. These positions include, for example, a park position "P", a reverse running position (i.e., reverse) "R", a neutral position "N", a forward automatic shift running position (i.e., drive) "D", and a forward manual shift running position (i.e., manual shift position) "M". Shifting the shift lever 48 into the park position "P" places the power transmitting apparatus 10 in a neutral state in which none of the clutches C1 to C3 are applied, as shown in the clutch and brake application chart in FIG. 2, such that the power transmitting path in the power transmitting apparatus 10, i.e., the second transmitting portion 20, is interrupted, and locks the output shaft 22 of the second transmitting portion 20. Shifting the shift lever 48 into the reverse position "R" enables the vehicle to run in reverse. Shifting the shift lever 48 into the neutral position "N" places the power transmitting apparatus 10 in a neutral state in which the power transmitting path therein is interrupted. Shifting the shift lever 48 into the drive position "D" enables the vehicle to run forward with shifting being performed automatically. Shifting the shift lever 48 into the manual position "M" enables the vehicle to run forward with shifting being performed manually. Of the shift positions "P" through "M", the "P" and "N" positions are non-running positions that are selected when the vehicle is not to be run. The "R", "D", and "M" positions are running positions that are selected when the vehicle is to be run. Also, the "D" position is the highest vehicle speed running position, and the ranges from the "4" range through the "L" range, for example, in the "M" position are engine brake ranges in which an engine brake effect can be obtained.

The "M" position is provided in the same position as the "D" position in the longitudinal direction of the vehicle, and adjacent to the "D" position in the width direction of the vehicle, for example. When the shift lever 48 is shifted into the "M" position, the range can be changed between the "D" range and the "L" range by operating the shift lever 48. More specifically, the "M" position has an upshift position "+" and a downshift position "−" in the longitudinal direction of the vehicle. When the shift lever 48 is operated into the upshift position "+" or the downshift position "−", the range changes between the "D" range and the "L" range. For example, the five shift ranges, i.e., the "D" range through the "L" range, in the "M" position are a plurality of various shift ranges that have a different total gear ratio γT on the high speed side (i.e., the side with the smallest gear ratio) in the range of the total gear ratio γT within which automatic shift control of the power transmitting apparatus 10 is possible. Also, these five ranges limit the shift range of the gears so that the highest gear into which the second transmitting portion 20 can be shifted is different. Further, the shift lever 48 is made to automatically return to the "M" position from the upshift position "+" and the downshift position "−" by an urging device such as a spring. Moreover, the shift operation executing apparatus 46 has a shift position sensor, not shown, for detecting the shift position of the shift operation executing apparatus 46. This shift position sensor outputs signals indicative of the shift position of the shift lever 48 and the number of operations in the "M" position and the like to the electronic control apparatus 40.

For example, when the shift lever 48 is shifted into the "D" position, various controls are executed based on the switching map shown in FIG. 8 that is stored in advance. More specifically, automatic switching control of the shift state in the power transmitting apparatus 10 is executed by the switch control unit 50, continuously variable shift control of the first transmitting portion 16 is executed by the hybrid control unit 52, and automatic shift control of the second transmitting portion 20 is executed by the stepped shift control unit 54. For example, during stepped shift running in which the power transmitting apparatus 10 is switched to the stepped shift state, the power transmitting apparatus 10 is controlled to automatically shift within the range from first gear to seventh gear as shown in FIG. 2, for example. On the other hand, during continuously variable shift running in which the power transmitting apparatus 10 is switched to the continuously variable shift state, the power transmitting apparatus 10 is controlled to automatically shift within the range of the total gear ratio $\gamma T$ where shifting is possible, which can be obtained by the continuous gear ratio range of the first transmitting portion 16 and the gears to which automatic shift control applies within the range of 1st gear to 4th gear in the second transmitting portion 20. This "D" position is also a shift position that selects an automatic shift running mode (i.e., automatic mode) which is a control mode in which automatic shift control of the power transmitting apparatus 10 is executed.

When the shift lever 48 is shifted into the "M" position, the power transmitting apparatus 10 is controlled by the switch control unit 50, the hybrid control unit 52, and the stepped shift control unit 54 to automatically shift within the range of the total gear ratio $\gamma T$ where shifting is possible in each shift range so as not to exceed the highest gear or gear ratio of the shift range. For example, during stepped shift running in which the power transmitting apparatus 10 is switched to the stepped shift state, the power transmitting apparatus 10 is controlled to automatically shift within the total gear ratio $\gamma T$ where shifting is possible in each shift range. On the other hand, during continuously variable shift running in which the power transmitting apparatus 10 is switched to the continuously variable shift state, the power transmitting apparatus 10 is controlled to automatically shift within the total gear ratio $\gamma T$ where shifting is possible in each shift range, which is obtained by the continuous gear ratio range of the first transmitting portion 16 and the gears to which automatic shift control applies within the range of gears into which the second transmitting portion 20 can be shifted for each shift range. This "M" position is also a shift position that selects a manual shift running mode (i.e., manual mode) which is a control mode in which manual shift control of the power transmitting apparatus 10 is executed.

When the power transmitting apparatus 10 is in the stepped shift state, it shifts in a stepped manner between gears from 1st gear to 7th gear. In some of those shifts, a shift is performed in first transmitting portion 16 at the same time that a shift is performed in the second transmitting portion 20. This is referred to as a "simultaneous shift". For example, when shifting from 2nd gear to 3rd gear, a shift is performed in the first transmitting portion 16 by releasing the switching brake B0 and applying the switching clutch C0, while at the same time that a shift is performed in the second transmitting portion 20 by releasing the second brake B2 and applying the first brake B1 such that a simultaneous shift occurs. This simultaneous shift also occurs when this shift is performed in reverse, i.e., when a shift from 3rd gear to 2nd gear is performed. Also, when shifting from 4th gear to 5th gear, a shift is performed in the first transmitting portion 16 by releasing the switching brake B0 and applying the switching clutch C0, while at the same time that a shift is performed in the second transmitting portion 20 by releasing the first brake B1 and applying the third clutch C3 such that a simultaneous shift occurs. This simultaneous shift also occurs when this shift is performed in reverse, i.e., when a shift from 5th gear to 4th gear is performed. When a simultaneous shift occurs in the first transmitting portion 16 and the second transmitting portion 20 in this way, that shift control may result in the occupant feeling significant shift shock which is sometimes produced at the end of a shift. Therefore, control is executed to reduce the likelihood of the occupant significantly feeling that shift shock. The operation of this control is described below.

Returning to FIG. 7, a shift state determining unit 70 determines whether two conditions are satisfied. These two conditions are (a) whether a shift in the first transmitting portion 16 will be performed simultaneously with a shift in the second transmitting portion 20, i.e., whether a shift to be performed in the power transmitting apparatus 10 involves a simultaneous shift, and if so, (b) whether the gear ratios in the first transmitting portion 16 and the second transmitting portion 20 will change in opposite directions in that simultaneous shift. The shift state determining unit 70 makes these determinations before the shifts in the first transmitting portion 16 and the second transmitting portion 20 start. Then if conditions (a) and (b) are both satisfied, the shift state determining unit 70 makes a positive determination. If not, the shift state determining unit 70 makes a negative determination. For example, in a shift from 2nd gear to 3rd gear, which involves a simultaneous shift, the switching brake B0 is released and the switching clutch C0 is applied in the first transmitting portion 16 so the gear ratio of the first transmitting portion 16 increases. Meanwhile, the second brake B2 is released and the first brake B1 is applied in the second transmitting portion 20 so the gear ratio of the second transmitting portion 20 decreases. Thus, the gear ratios of the first transmitting portion 16 and the second transmitting portion 20 change in opposite directions. Also, in a shift from 3rd gear to 2nd gear, which is the reverse of that shift, as well as in a shift between 4th gear and 5th gear, the gear ratios of the first transmitting portion 16 and the second transmitting portion 20 change in opposite directions. Therefore, the shift state determining unit 70 more specifically stores shift patterns that involve a simultaneous shift beforehand, and makes a positive determination when a shift command for a shift pattern that involves a simultaneous shift is output. That is, the shift state determining unit 70 makes a positive determination when a stepped shift between 2nd gear and 3rd gear or between 4th gear and 5th gear is to be performed, and makes a negative determination in all other cases.

If the shift state determining unit 70 makes a positive determination, a simultaneous shift control unit 72 ends the shifts by controlling the shift in the first transmitting portion 16 using the first electric motor M1 and controlling the second transmitting portion 20 using the second electric motor M2, while controlling the hydraulic pressures of apply elements such as clutches and brakes in the first transmitting portion 16 and the second transmitting portion 20 to end the shift in either the first transmitting portion 16 or the second transmitting portion 20 while the shift is being performed in the other.

At this time, either shift, i.e., the shift in the first transmitting portion 16 or the shift in the second transmitting portion 20, may be ended first, but in this example embodiment when a simultaneous shift occurs, i.e., when a stepped shift is performed between 2nd gear and 3rd gear or between 4th gear and 5th gear, the second transmitting portion 20 is always the transmitting portion with the gear ratio that changes in the same direction as the change in the total gear ratio γT of the overall power transmitting apparatus 10 so the simultaneous shift control unit 72 starts the shift (i.e., the inertia phase) in the first transmitting portion 16 after the start of the shift (i.e., the start of the inertia phase) in the second transmitting portion 20 in which the gear ratio changes in the same direction as the total gear ratio γT, and ends the shift in the first transmitting portion 16 while the shift is being performed in the second transmitting portion 20. That is, the simultaneous shift control unit 72 ends the shift in the first transmitting portion 16 within the period of the inertia phase, during which the input rotation speed $N2_{IN}$ changes, of the shift of the second transmitting portion 20. More specifically, the simultaneous shift control unit 72 performs shifts in the first transmitting portion 16 and the second transmitting portion 20 in the manner described in steps (1) to (8) below. Incidentally, in this example embodiment, the engine 8, the first transmitting portion 16, the second transmitting portion 20, and the driving wheels 38 are connected in series in that order. Therefore, the input rotation speed $N1_{IN}$ of the first transmitting portion 16 is the same as the rotation speed $N_{IN}$ of the input shaft 14, the output rotation speed $N1_{OUT}$ of the first transmitting portion 16 and the input rotation speed $N2_{IN}$ of the second transmitting portion 20 are both equal and the same as the rotation speed of the transmitting member 18, and the output rotation speed $N2_{OUT}$ of the second transmitting portion 20 is the same as the rotation speed $N_{OUT}$ of the output shaft 22.

(1) First, the simultaneous shift control unit 72 starts to control the hydraulic pressure supplied to the second transmitting portion 20 in order to start the shift in the second transmitting portion 20. More specifically, the simultaneous shift control unit 72 starts to reduce the hydraulic pressure to the release-side apply element of the second transmitting portion 20 and increase the hydraulic pressure to the apply-side apply element. Then the simultaneous shift control unit 72 starts to supply hydraulic pressure to the apply-side apply element of the first transmitting portion 16 to improve the shift response of the first transmitting portion 16. For example, in a shift from 2nd gear to 3rd gear, the simultaneous shift control unit 72 starts to reduce the hydraulic pressure to the second brake B2 and increase the hydraulic pressure to the first brake B1. Then the simultaneous shift control unit 72 starts to supply hydraulic pressure to the switching clutch C0.

(2) Next, the simultaneous shift control unit 72 reduces the hydraulic pressure of the release-side apply element of the first transmitting portion 16 to a pressure that is lower than the hydraulic pressure during application when a shift is not being performed, but not so low that it will initiate the inertia phase of the shift in the first transmitting portion 16, i.e., to a first pressure PR1 which is a pressure that is as low as possible without allowing the apply element to slip. In addition, the simultaneous shift control unit 72 prohibits the start of the inertia phase in the first transmitting portion 16. More specifically, the simultaneous shift control unit 72 controls the first electric motor rotation speed $N_{M1}$ so that the gear ratio prior to the shift in the first transmitting portion 16 is maintained. For example, in a shift from 2nd gear to 3rd gear, the simultaneous shift control unit 72 reduces the pressure in the switching brake B0 to a first pressure $PR1_{B0}$ (i.e., the first pressure PR1 for the switching brake B0), and in addition, forcibly holds the rotation speed of the sun gear S0 at zero using the first electric motor M1. Incidentally, the first pressure PR1 is obtained through testing and the like in advance for each apply element of the first transmitting portion 16 and the second transmitting portion 20, and stored in the simultaneous shift control unit 72.

(3) Next, the simultaneous shift control unit 72 determines whether the inertia phase of the second transmitting portion 20 has started, i.e., whether the input rotation speed $N2_{IN}$ of the second transmitting portion 20 has started to change, within a predetermined period of time. If it is not confirmed that the inertia phase of the second transmitting portion 20 has started to change within the predetermined period of time, the simultaneous shift control unit 72 forces the inertia phase in the second transmitting portion 20 to start by changing the input rotation speed $N2_{IN}$ of the second transmitting portion 20 using the second electric motor M2 so that it approaches the rotation speed after the shift ends. For example, in a shift from 2nd gear to 3rd gear, the simultaneous shift control unit 72 starts to reduce the input rotation speed $N2_{IN}$ of the second transmitting portion 20. Incidentally, the predetermined period of time for making the foregoing determination is a window time for the simultaneous shift control unit 72 to determine whether to forcibly start the inertia phase of the second transmitting portion 20, and is obtained through testing or the like in advance so as not to lose shift response, and stored in the simultaneous shift control unit 72. Also, regardless of the foregoing determination, the simultaneous shift control unit 72 may also force the inertia phase of the second transmitting portion 20 to start by changing the input rotation speed $N2_{IN}$ of the second transmitting portion 20 using the second electric motor M2 so that it approaches the rotation speed after the shift ends, after the predetermined period of time has passed.

(4) When it has been confirmed that the inertia phase of the second transmitting portion 20 has started, the simultaneous shift control unit 72 advances the shift in the first transmitting portion 16 by further reducing the hydraulic pressure in the release-side apply element of the first transmitting portion 16 that has already been reduced to the first pressure PR1, and increasing the hydraulic pressure in the apply-side apply element of the first transmitting portion 16. For example, in a shift from 2nd gear to 3rd gear, the simultaneous shift control unit 72 advances the shift in the first transmitting portion 16 by further reducing the pressure in the switching brake B0 that has already been reduced to the first pressure $PR1_{B0}$, and increases the pressure in the switching clutch C0.

(5) Next, the simultaneous shift control unit 72 allows the inertia phase of the first transmitting portion 16, which had been prohibited from starting, to start because the inertia phase of the second transmitting portion 20 has started.

(6) Next, the simultaneous shift control unit 72 determines whether the inertia phase of the first transmitting portion 16 has started within a predetermined period of time. If it is not confirmed that the inertia phase of the first transmitting portion 16 has started within the predetermined period of time, the simultaneous shift control unit 72 forces the inertia phase of the first transmitting portion 16 to start by changing the relative rotation speeds among the rotating elements RE1, RE2, and RE3 of the first transmitting portion 16 using the first electric motor M1 so that they approach the relative rotation speeds after the shift ends. For example, in a shift from 2nd gear to 3rd gear, the simultaneous shift control unit 72 controls the first electric motor M1 so that the relative rotation speeds among the rotating elements RE1, RE2, and RE3 of the first transmitting portion 16 approach zero, which is what they will be after the shift ends. Incidentally, the predetermined period of time for making the foregoing determination is a window time for the simultaneous shift control unit 72 to determine whether to forcibly start the inertia phase of the first transmitting portion 16, and is obtained through testing or the like in advance so as not to lose shift response, and stored in the simultaneous shift control unit 72. Also, regardless of the foregoing determination, the simultaneous shift control unit 72 may also force the inertia phase of the first transmitting portion 16 to start by changing the relative rotation speeds among the rotating elements RE1, RE2, and RE3 of the first transmitting portion 16 using the first electric motor M1 so that they approach the relative rotation speeds after the shift ends, after the predetermined period of time has passed.

(7) Next, the simultaneous shift control unit 72 determines whether the inertia phase of the first transmitting portion 16 has ended, i.e., whether the shift in the first transmitting portion 16 has ended. Then the simultaneous shift control unit 72 prohibits the inertia phase of the second transmitting portion 20 from ending until the inertia phase of the first transmitting portion 16 ends. Also, if the end of the inertia phase of the first transmitting portion 16 is delayed based on the first electric motor rotation speed $N_{M1}$, the second electric motor rotation speed $N_{M2}$, and the engine speed $N_E$ and the like such that it is predicted that the inertia phase of the first transmitting portion 16 will not end before the inertia phase of the second transmitting portion 20 ends, the simultaneous shift control unit 72 controls the input rotation speed $N2_{IN}$ of the second transmitting portion 20 using the second electric motor M2 to slow the progress of the shift in the second transmitting portion 20, as well as slows the increase in the hydraulic pressure in the apply-side apply element of the second transmitting portion 20, such that the inertia phase of the first transmitting portion 16 will end before the inertia phase of the second transmitting portion 20 ends. Incidentally, although the simultaneous shift control unit 72 controls the first electric motor M1 and the second electric motor M2 and the hydraulic pressure supplied to the first transmitting portion 16 and the second transmitting portion 20 so that the inertia phase of the first transmitting portion 16 will end before the inertia phase of the second transmitting portion 20 end, the end of the inertia phase of the first transmitting portion 16 may be delayed due to variation in the hydraulic pressure properties and the properties of the friction material of the apply elements, and the like. Therefore, the simultaneous shift control unit 72 may determine whether the inertia phase of the first transmitting portion 16 has ended, and when necessary, slow the progress of the shift in the second transmitting portion 20 using the second electric motor M2 as described above. Slowing the progress of the shift in the second transmitting portion 20 using the second electric motor M2 specifically refers to the simultaneous shift control unit 72 controlling the second electric motor rotation speed $N_{M2}$ to reduce the rate of change per unit time in the input rotation speed $N2_{IN}$ of the second transmitting portion 20 as the inertia phase of the second transmitting portion 20 progresses while that input rotation speed $N2_{IN}$ approaches the rotation speed after the shift in the second transmitting portion 20 ends.

(8) Next, when the inertia phase of the first transmitting portion 16 has ended, the simultaneous shift control unit 72 allows the inertia phase of the second transmitting portion 20 to end and ends the inertia phase of the second transmitting portion 20.

Incidentally, in steps (1) through (8) described above, the simultaneous shift control unit 72 performs shifts in the first transmitting portion 16 and the second transmitting portion 20. That is, the simultaneous shift control unit 72 performs control to bring the ratio of the input rotation speed $N1_{IN}$ to the output rotation speed $N1_{OUT}$ during the shift in the first transmitting portion 16 closer to the gear ratio after the shift in the first transmitting portion 16 ends using the first electric motor M1 from start to end of the inertia phase of the first transmitting portion 16. In other words, the simultaneous shift control unit 72 performs speed synchronizing control of the first transmitting portion 16, which is control that brings the relative rotation speeds among the rotating elements RE1, RE2, and RE3 of the first transmitting portion 16 closer to the relative rotation speeds after the shift in the first transmitting portion 16 ends using the first electric motor M1. Also, with the second transmitting portion 20 as well, the simultaneous shift control unit 72 performs control to bring the ratio of the input rotation speed $N2_{IN}$ to the output rotation speed $N2_{OUT}$ during the shift in the second transmitting portion 20 closer to the gear ratio after the shift in the second transmitting portion 20 ends using the second electric motor M2 from start to end of the inertia phase of the second transmitting portion 20. In other words, the simultaneous shift control unit 72 performs speed synchronizing control of the second transmitting portion 20, which is control that brings the input rotation speed $N2_{IN}$ of the second transmitting portion 20 closer to the rotation speed after the shift in the second transmitting portion 20 ends using the second electric motor M2. During the speed synchronizing control of the first transmitting portion 16, neither the switching clutch C0 nor the switching brake B0 are completely applied so it is necessary to use the second electric motor M2 to generate reaction torque against the output torque $T_{M1}$ of the first electric motor M1. Accordingly, the simultaneous shift control unit 72 controls the output torque $T_{M2}$ of the second electric motor M2 for the speed synchronizing control of the first transmitting portion 16 as well.

Also, from steps (1) through (8) described above, the speed synchronizing control of the first transmitting portion 16 using the first electric motor M1 is performed during the inertia phase during which the input rotation speed $N2_{IN}$ of the second transmitting portion 20 changes. Therefore, in the speed synchronizing control of the first transmitting portion 16, the simultaneous shift control unit 72 controls the first electric motor rotation speed $N_{M1}$ according to the change in the input rotation speed $N2_{IN}$ of the second transmitting portion 20, which has a one-to-one relationship with the output rotation speed $N1_{OUT}$ of the first transmitting portion 16, while detecting that input rotation speed $N2_{IN}$. Also, during a simultaneous shift in the power transmitting apparatus 10, in the inertia phase of a shift in the first transmitting portion 16 in which the gear ratio changes in the direction opposite the direction in which the total gear ratio γT of the power transmitting apparatus 10 changes, the direction in which the engine speed $N_E$ changes may reverse. Therefore, the simultaneous shift control unit 72 controls the change in the engine speed $N_E$ using the first electric motor M1 so that the direction in which the engine speed $N_E$ changes during a shift in the power transmitting apparatus 10 will not reverse even temporarily.

Also, during the shifts in the first transmitting portion 16 and the second transmitting portion 20, the simultaneous shift control unit 72 needs to change the engine speed $N_E$ so that those shifts can progress. In order to facilitate the speed synchronizing control of the first transmitting portion 16 and the second transmitting portion 20, the simultaneous shift control unit 72 reduces the engine torque $T_E$ while the engine speed $N_E$ is changing during the shift in the first transmitting portion 16, and while the engine speed $N_E$ is changing during the shift in the second transmitting portion 20.

Figure 10:
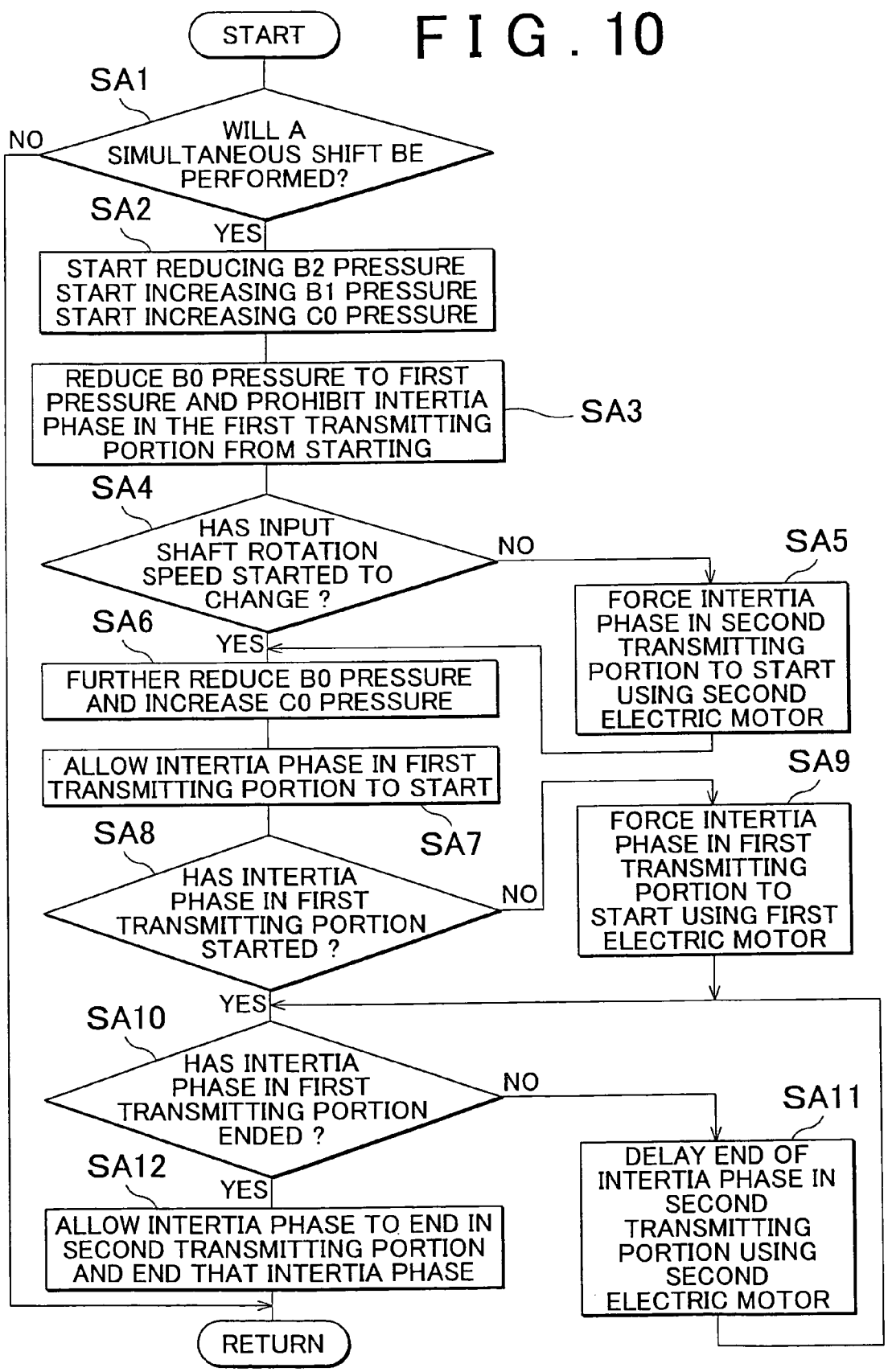
FIG. 10 is a flowchart illustrating the main portions of a control operation of the electronic control apparatus shown in FIG. 6, i.e., the control operation when a stepped simultaneous shift is performed in the power transmitting apparatus.

FIG. 10 is a flowchart illustrating a main portion of the control operation of the electronic control apparatus 40, i.e., the control operation when a stepped simultaneous shift is performed in the power transmitting apparatus 10. This control operation is repeatedly executed in extremely short cycles on the order of several milliseconds to several tens of milliseconds, for example. While the simultaneous shift described above occurs in both a shift between 2nd gear and 3rd gear and a shift between 4th gear and 5th gear in this example embodiment, the control operation shown in FIG. 10 will be described with respect to a shift from 2nd gear to 3rd gear as an example.

First, in step SA1 which corresponds to the shift state determining unit 70, it is determined whether two conditions (a) and (b) are satisfied. That is, it is determined whether (a) a shift will be performed in the first transmitting portion 16 at the same time that a shift will be performed in the second transmitting portion 20, i.e., whether a shift to be performed in the power transmitting apparatus 10 involves a simultaneous shift, and if so, (b) whether the gear ratios in the first transmitting portion 16 and the second transmitting portion 20 will change in the opposite direction in that simultaneous shift. If both conditions (a) and (b) are satisfied, a positive determination is made in step SA1. If not, a negative determination is made in that step. For example, in a shift from 2nd gear to 3rd gear, which involves a simultaneous shift, the direction in which the gear ratio of the first transmitting portion 16 changes is opposite the direction in which the gear ratio of the second transmitting portion 20 changes. Therefore, both conditions (a) and (b) are satisfied. If the determination in step SA1 is positive, i.e., if both conditions (a) and (b) are satisfied, then the process proceeds on to step SA2. However, if that determination is negative, the control operation in this flowchart ends. Incidentally, with a shift in only the first transmitting portion 16 or only the second transmitting portion 20, control that is different from that in the steps SA2 and thereafter, which are described below, is performed.

In step SA2, the hydraulic pressure to the release-side apply element of the second transmitting portion 20 starts to be reduced and the hydraulic pressure to the apply-side apply element of the second transmitting portion 20 starts to be increased. Then hydraulic pressure starts to be supplied to the apply-side apply element of the first transmitting portion 16 to improve the shift response of the first transmitting portion 16. For example, in a shift from 2nd gear to 3rd gear, the hydraulic pressure to the second brake B2 starts to be reduced and the hydraulic pressure to the first brake B1 starts to be increased. Then hydraulic pressure starts to be supplied to the switching clutch C0.

Then in step SA3 which follows step SA2, the hydraulic pressure in the release-side apply element of the first transmitting portion 16 is reduced to a predetermined first pressure PR1. In addition to this, the inertia phase of the first transmitting portion 16 is prohibited from starting. More specifically, the first electric motor rotation speed $N_{M1}$ is controlled so that the gear ratio before the shift in the first transmitting portion 16 is maintained. For example, in a shift from 2nd gear to 3rd gear, the hydraulic pressure in the switching brake B0 is reduced to a predetermined first pressure $PR1_{B0}$, and the rotation speed of the sun gear S0 is forcibly held at zero by the first electric motor M1.

Then in step SA4 which follows step SA3, it is determined whether the inertia phase of the second transmitting portion 20 has started, i.e., whether the input rotation speed $N2_{IN}$ of the second transmitting portion 20 has started to change, within a predetermined period of time. If the determination in step SA4 is positive, i.e., if the input rotation speed $N2_{IN}$ of the second transmitting portion 20 has started to change within the predetermined period of time, then the process proceeds on to step SA6. If, on the other hand, the determination is negative, i.e., if the input rotation speed $N2_{IN}$ of the second transmitting portion 20 has not started to change within the predetermined period of time, then the process proceeds on to step SA5.

In step SA5, the inertia phase of the second transmitting portion 20 is forcibly started by changing the input rotation speed $N2_{IN}$ of the second transmitting portion 20 using the second electric motor M2 so that it approaches the rotation speed after the shift ends. For example, in a shift from 2nd gear to 3rd gear, the input rotation speed $N2_{IN}$ of the second transmitting portion 20 starts to be reduced by the second electric motor M2.

In step SA6, the shift in the first transmitting portion 16 is advanced (i.e., made to progress) by further reducing the hydraulic pressure in the release-side apply element of the first transmitting portion 16, which has already been reduced to the first pressure PR1, and increasing the hydraulic pressure in the apply-side apply element of the first transmitting portion 16. For example, in a shift from 2nd gear to 3rd gear, the shift in the first transmitting portion 16 is advanced by the hydraulic pressure in the switching brake B0, which has already been reduced to the first pressure $PR1_{B0}$, being reduced further, and the hydraulic pressure in the switching clutch C0 being increased.

In step SA7 which follows step SA6, the inertia phase of the first transmitting portion 16, which had been prohibited from starting in step SA3, is allowed to start because the inertia phase of the second transmitting portion 20 has started.

Then in step SA8 which follows step SA7, it is determined whether the inertia phase of the first transmitting portion 16 has started within a predetermined period of time. The determination as to whether the first transmitting portion 16 has started can be made for detecting the engine speed $N_E$ and the second electric motor rotation speed $N_{M2}$, for example. If the determination in step SA8 is positive, i.e., if the inertia phase of the first transmitting portion 16 has started within the predetermined period of time, then the process proceeds on to step SA10. If, on the other hand, this determination is negative, i.e., if the inertia phase of the first transmitting portion 16 has not started within the predetermined period of time, then the process proceeds on to step SA9.

In step SA9, the inertia phase of the first transmitting portion 16 is forcibly started by changing the relative rotation speeds among the rotating elements RE1, RE2, and RE3 of the first transmitting portion 16 using the first electric motor M1 so that they come closer to the relative rotation speeds after the shift has ended. For example, in a shift from 2nd gear to 3rd gear, the first electric motor M1 is controlled to bring the relative rotation speeds among the rotating elements RE1, RE2, and RE3 of the first transmitting portion 16 closer to zero, which is what they will be at after the shift ends.

In step SA10, it is determined whether the inertia phase of the first transmitting portion 16 has ended, i.e., whether the shift in the first transmitting portion 16 has ended. If the determination in step SA10 is positive, i.e., if it is determined that the inertia phase of the first transmitting portion 16 has ended, then the process proceeds on to step SA12. If, on the other hand, this determination is negative, i.e., if the inertia phase of the first transmitting portion 16 has not yet ended, then the process proceeds on to step SA11.

In step SA11, if the end of the inertia phase of the first transmitting portion 16 is delayed such that it is predicted that the inertia phase of the first transmitting portion 16 will not end before the inertia phase of the second transmitting portion 20 ends, then the input rotation speed $N2_{IN}$ of the second transmitting portion 20 is controlled by the second electric motor M2 to slow the progress of the shift in the second transmitting portion 20, and the increase in the hydraulic pressure in the apply-side apply element of the second transmitting portion 20 is also slowed so that the inertia phase of the first transmitting portion 16 will end before the inertia phase of the second transmitting portion 20 ends. Then after step SA11, step SA10 is executed again.

In step SA12, the inertia phase of the second transmitting portion 20 is allowed to end because the inertia phase of the first transmitting portion 16 has ended, so the inertia phase of the second transmitting portion 20 is ended. Incidentally, steps SA2 to SA12 correspond to the simultaneous shift control unit 72.

Figure 11:
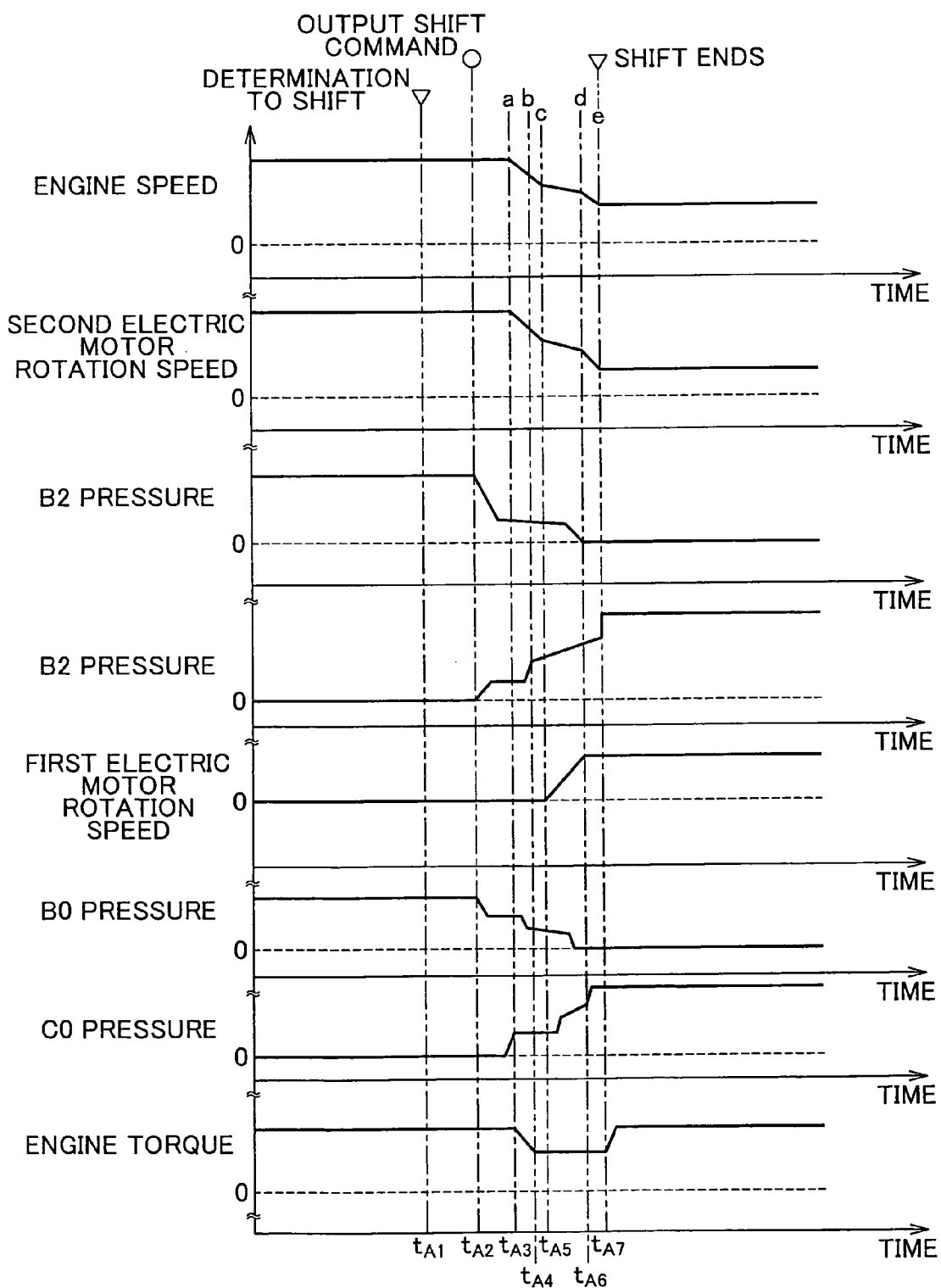
FIG. 11 is a time chart showing the control operation illustrated in the flowchart shown in FIG. 10, in the case of a shift from 2nd gear to 3rd gear.

FIG. 11 is a time chart showing the control operation illustrated in the flowchart shown in FIG. 10, in the case of a shift from 2nd gear to 3rd gear. The time chart in FIG. 11 shows, in order from top to bottom, the changes over time in the engine speed $N_E$, the second electric motor rotation speed $N_{M2}$, the hydraulic pressure in the second brake B2 which is the release-side apply element of the second transmitting portion 20, the hydraulic pressure in the first brake B1 which is the apply-side apply element of the second transmitting portion 20, the first electric motor rotation speed $N_{M1}$, the hydraulic pressure in the switching brake B0 which is the release-side apply element of the first transmitting portion 16, the hydraulic pressure in the switching clutch C0 which is the apply-side apply element of the first transmitting portion 16, and the engine torque $T_E$.

At time $t_{A1}$ in FIG. 11 it is determined that a shift from 2nd gear to 3rd gear should be performed as a result of the vehicle speed V changing from point a to point b on the shift line graph in FIG. 8, for example. At time $t_{A2}$, a shift command to shift from 2nd gear to 3rd gear is output based on that determination. When the shift command is output, the shift from 2nd gear to 3rd gear has a shift pattern that involves a simultaneous shift and the gear ratio of the first transmitting portion 16 changes in the opposite direction from the gear ratio of the second transmitting portion 20 so a positive determination is made in step SA1 in FIG. 10 such that steps SA2 and SA3 are executed. Accordingly, from time $t_{A2}$ in FIG. 11, the hydraulic pressure in the second brake B2 starts to be reduced and the hydraulic pressure in the first brake B1 starts to be increased, and the hydraulic pressure in the switching brake B0 starts to be reduced to the first pressure $PR1_{B0}$. Then, because hydraulic pressure started to be supplied to the switching clutch C0 at time $t_{A2}$, the hydraulic pressure in that switching clutch C0 starts to increase shortly after time $t_{A2}$. Incidentally, the rotation speed of the sun gear S0 is forcibly held at zero by the first electric motor M1 in step SA3 in FIG. 10 so at time $t_{A2}$ the first electric motor rotation speed $N_{M1}$ is still zero.

At time $t_{A3}$ indicated by the alternate long and two short dashes line a in FIG. 11, the second electric motor rotation speed $N_{M2}$ which is the input rotation speed $N2_{IN}$ of the second transmitting portion 20 starts to decrease, i.e., the inertia phase of the shift in the second transmitting portion 20 starts. As the second electric motor rotation speed $N_{M2}$ starts to decrease, so too does the engine speed $N_E$, also from time $t_{A3}$ (indicated by the alternate long and two short dashes line a). This start of the inertia phase of the second transmitting portion 20 results in a positive determination being made in step SA4 in FIG. 10. As a result, step SA6 is executed such that the hydraulic pressure in the switching brake B0, which has already been reduced to the first pressure PR1, is reduced further between time $t_{A3}$ (indicated by the alternate long and two short dashes line a) and time $t_{A4}$ (indicated by the alternate long and two short dashes line b) in FIG. 11. Then, because of the positive determination in step SA4, step SA7 is executed such that the inertia phase of the shift in the first transmitting portion 16 is allowed to start.

Even though the inertia phase of the first transmitting portion 16 is allowed to start by executing step SA7 in FIG. 10, it has not yet started so the determination in step SA8 is negative. As a result, step SA9 is executed so from time $t_{A5}$ indicated by the alternate long and two short dashes line c in FIG. 11, the first electric motor rotation speed $N_{M1}$ starts to increase, and the inertia phase of the first transmitting portion 16 is forcibly started by the first electric motor M1. Then in order to advance the shift in the first transmitting portion 16, the hydraulic pressure in the switching clutch C0 that has been increased to a predetermined pressure starts to be further increased shortly after time $t_{A5}$ (indicated by the alternate long and two short dashes line c).

At time $t_{A6}$ indicated by the alternate long and two short dashes line d in FIG. 11, the inertia phase of the shift in the first transmitting portion 16 ends, i.e., the shift in the first transmitting portion 16 ends. Then, because the inertia phase of the shift in the first transmitting portion 16 has ended, the hydraulic pressure in the switching clutch C0 is increased to the maximum pressure at time $t_{A6}$ (indicated by the alternate long and short two dashes line d). Incidentally, this shift in the power transmitting apparatus 10 from 2nd gear to 3rd gear is an upshift for the overall power transmitting apparatus 10 so the engine speed $N_E$ during the shift drops as shown in FIG. 11. The shift progresses with the engine speed $N_E$ being forcibly reduced by being controlled through control of the first electric motor M1 and hydraulic control of the switching clutch C0 so that it will not increase, even temporarily, during the inertia phase of the shift in the first transmitting portion 16. At this time, feedback control or feed forward control is performed so that the engine speed $N_E$ comes to match a predetermined target value. Also, the engine speed $N_E$ may also be controlled by storing information regarding the manner in which the shift progressed the last time (i.e., the last shift progression state) and applying learning control that controls the first electric motor M1, the second electric motor M2, and the actuators of the apply elements and the like that are involved in the shift based on that stored shift progression state.

At time $t_{A7}$ indicated by the alternate long and two short dashes line e in FIG. 11, the second electric motor rotation speed $N_{M2}$ which is the input rotation speed $N2_{IN}$ of the second transmitting portion 20 stops decreasing and the shift in the second transmitting portion 20 ends. Then, because the inertia phase of the shift in the second transmitting portion 20 has ended, the hydraulic pressure in the first brake B1 is increased to the maximum pressure at time $t_{A7}$ (indicated by the alternate long and two short dashes line e). Incidentally, the shift in the first transmitting portion 16 has already ended at time $t_{A6}$ (indicated by the alternate long and two short dashes line d) so the shift in the power transmitting apparatus 10 ends with the end of the shift in the second transmitting portion 20 at time $t_{A7}$. Accordingly, the engine speed $N_E$ stops dropping at time $t_{A7}$ (indicated by the alternate long and two short dashes line e). Also, the reduction in engine torque $T_E$, which is reduced from time $t_{A3}$ (indicated by the alternate long and two short dashes line a) when the engine speed $N_E$ starts to decrease, is cancelled at time $t_{A7}$ (indicated by the alternate long and two short dashes line e) so the engine torque $T_E$ returns to the torque before the shift.

The electronic control apparatus 40 in this example embodiment yields the following effects (A1) to (A9).

(A1) When a shift is performed in the first transmitting portion 16 at the same time that a shift is performed in the second transmitting portion 20 and the direction in which the gear ratio of the first transmitting portion 16 changes is opposite the direction in which the gear ratio of the second transmitting portion 20 changes, the simultaneous shift control unit 72 controls the shift in the first transmitting portion 16 using the first electric motor M1 and controls the shift in the second transmitting portion 20 using the second electric motor M2 so that one shift (either the shift in the first transmitting portion 16 or the shift in the second transmitting portion 20) ends before the other shift (i.e., the shift in the other transmitting portion) ends, i.e., while the other shift is being performed. As a result, the two shifts will not end at the same time so the amount of shift shock felt by an occupant can be reduced. Also, the other shift ends after the one shift has already ended so the shift control load at the end of the other shift can be reduced, which enables the accuracy of the control of the other shift to be improved. As a result, shift shock that occurs when the other shift ends can be reduced. Also, controlling the shift in the first transmitting portion 16 using the first electric motor M1 and controlling the shift in the second transmitting portion 20 using the second electric motor M2 enables the progress of the shifts in the first transmitting portion 16 and the second transmitting portion 20 to be actively adjusted.

(A2) When a shift is performed in the first transmitting portion 16 at the same time that a shift is performed in the second transmitting portion 20 and the direction in which the gear ratio of the first transmitting portion 16 changes is opposite the direction in which the gear ratio of the second transmitting portion 20 changes, the inertia phase of the shift in the first transmitting portion 16 starts after the start of the inertia phase of the shift in the second transmitting portion 20 in which the gear ratio changes in the same direction as the total gear ratio γT of the overall power transmitting apparatus 10 changes, and the shift in the first transmitting portion 16 ends while the shift in the second transmitting portion 20 is being performed. Therefore, during a shift in the power transmitting apparatus 10, the direction in which the engine speed $N_E$ changes can be prevented from reversing even though the rate of change in the engine speed $N_E$ may change. As a result, the possibility of an unpleasant sensation being imparted to the driver during a shift in the power transmitting apparatus 10 can be reduced.

(A3) The shifts in the first transmitting portion 16 and the second transmitting portion 20 are controlled by operating apply elements provided therein using hydraulic control. Further, in conjunction with the hydraulic control, the first electric motor M1 and the second electric motor M2 are used to control the input rotation speeds $N1_{IN}$ and $N2_{IN}$ and the output rotation speeds $N1_{OUT}$ and $N2_{OUT}$ of the first and second transmitting portions 16 and 20 in the shift control of those transmitting portions 16 and 20. Accordingly, using the first electric motor M1 and the second electric motor M2 in addition to the hydraulic control makes it easier to perform shift control to end one shift (either the shift in the first transmitting portion 16 or the shift in the second transmitting portion 20) while the other shift is being performed.

(A4) The shift in the first transmitting portion 16 ends during the inertia phase of the shift in the second transmitting portion 20. As a result, the shifts in the first transmitting portion 16 and the second transmitting portion 20 will not end at the same time so the amount of shift shock felt by an occupant can be reduced. Also, the shift in the second transmitting portion 20 ends after the shift in the first transmitting portion 16 has already ended so the shift control load at the end of the shift in the second transmitting portion 20 can be reduced, which enables the accuracy of the control of the shift in the second transmitting portion 20 to be improved. As a result, shift shock that occurs when the shift in the second transmitting portion 20 ends can be reduced.

(A5) The first transmitting portion 16 is connected to the engine 8 and the second transmitting portion 20 forms a portion of the power transmitting path from the first transmitting portion 16 to the driving wheels 38. Therefore, the first transmitting portion 16 and the second transmitting portion 20 are connected in series so the change width of the total gear ratio γT of the overall power transmitting apparatus 10 can be increased by performing shifts in both the first transmitting portion 16 and the second transmitting portion 20. Also, in this example embodiment, the shift in the first transmitting portion 16 ends during the inertia phase of the shift in the second transmitting portion 20. Therefore, the power transmitting path in the second transmitting portion 20 is not completely connected when the shift in the first transmitting portion 16 ends because a shift in the second transmitting portion 20 is being performed. As a result, shift shock in the first transmitting portion 16 can be suppressed from being transmitted to the driving wheels 38.

(A6) The power transmitting apparatus 10 is provided with at least one electric motor, i.e., the first electric motor M1 and the second electric motor M2, and the first transmitting portion 16 has the plurality of rotating elements RE1, RE2, and RE3. The first electric motor M1 and the engine 8 are connected, so as to be able to transmit power, to different rotating elements RE1 and RE2 of the first transmitting portion 16, and the first electric motor M1 is used to control the change in the engine speed $N_E$, which makes it possible to reduce the effect that a change in the engine speed $N_E$ has on the shifts in the first transmitting portion 16 and the second transmitting portion 20. Also, it is possible to prevent the direction in which the engine speed $N_E$ changes from reversing during a shift in the power transmitting apparatus 10 by using the first electric motor M1. Accordingly, the possibility of an unpleasant sensation being imparted on an occupant due to a reverse in the direction in which the engine speed $N_E$ changes can be reduced.

(A7) When the shift state determining unit 70 makes a positive determination, the simultaneous shift control unit 72 controls the change in the engine speed $N_E$ using the first electric motor M1 so that the direction in which the engine speed $N_E$ changes during a shift in the power transmitting apparatus 10 does not reverse, even temporarily. As a result, the possibility of an unpleasant sensation being imparted on an occupant due to a reverse in the direction in which the engine speed $N_E$ changes can be reduced.

(A8) The power transmitting apparatus 10 includes the first electric motor M1 and the second electric motor M2. The first electric motor M1 is connected, so as to be able to transmit power, to the first rotating element RE1 of the first transmitting portion 16, and the first electric motor rotation speed $N_{M1}$ is controlled according to the change in the input rotation speed $N2_{IN}$ of the second transmitting portion 20. Therefore, the effect that a change in the input rotation speed $N2_{IN}$ of the second transmitting portion 20 has on a shift in the first transmitting portion 16 can be reduced by controlling the first electric motor rotation speed $N_{M1}$.

(A9) The engine torque $T_E$ is reduced while the engine speed $N_E$ is changing during a shift in the first transmitting portion 16 so the effect that the engine 8 has on the shift in the first transmitting portion 16 can be reduced. Also, reducing the effect that the engine 8 has on the first transmitting portion 16 enables a shift in the first transmitting portion 16 to be controlled easily and accurately by the first electric motor M1.

Next, a second example embodiment of the invention will be described. Incidentally, in the following description, parts in this second example embodiment that are common to the first example embodiment described above will be denoted by like reference numerals, and descriptions of those parts will be omitted.

Figure 12:
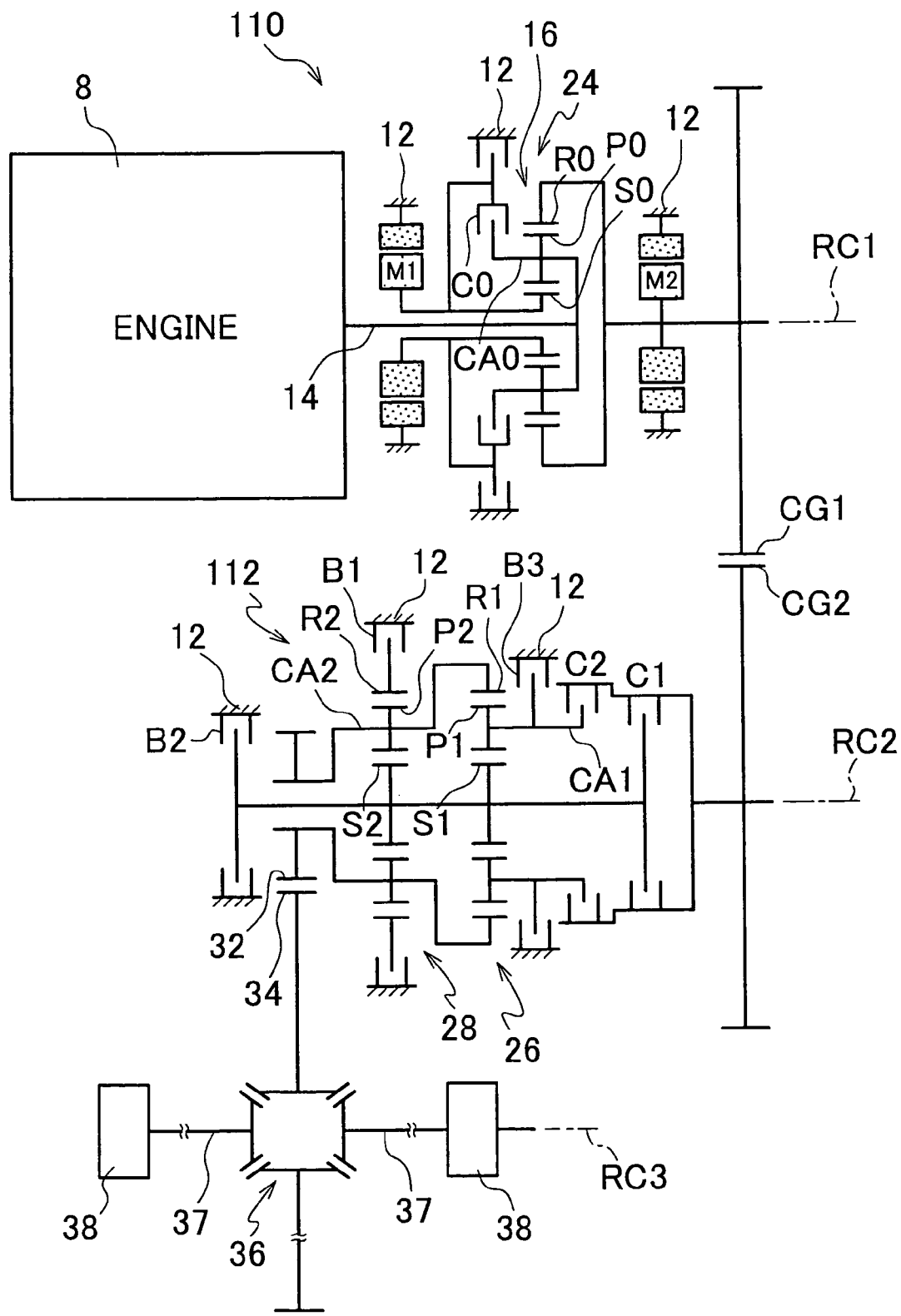
FIG. 12 is a skeleton view corresponding to FIG. 1, which shows the structure of a power transmitting apparatus of a hybrid vehicle according to a second example embodiment of the invention.

FIG. 12 is a skeleton view of a power transmitting apparatus 110 according to a second example embodiment of the invention. The power transmitting apparatus 110, which constitutes the vehicular drive control apparatus of the invention, differs from the power transmitting apparatus 10 in FIG. 1 in three ways. 1) The power transmitting apparatus 110 has a second transmitting portion 112 instead of the second transmitting portion 20 provided in the power transmitting apparatus 10 shown in FIG. 1. 2) The first transmitting portion 16 which forms part of the power transmitting apparatus 110 is arranged on a first axis RC1, the second transmitting portion 112 which also forms part of the power transmitting apparatus 110 is arranged on a second axis RC2, and the differential gear unit 36 which also forms part of the power transmitting apparatus 110 is arranged on a third axis RC3, and these three axes RC1, RC2, and RC3 are parallel to each other so as to be suitable for an FF (front engine-front drive) type drive system in which the dimension of the power transmitting apparatus 10 in FIG. 1 is shorter in the axial direction. 3) The transmitting member 18 in FIG. 1 is changed to a pair of counter gears (CG1 and CG2). The following description will focus mainly these differences.

As shown in FIG. 12, the power transmitting apparatus 110 includes the engine 8, the input shaft 14, the first transmitting portion 16, the second transmitting portion 112, a differential drive gear 32, the pair of counter gears CG, and the differential gear unit 36, with all but the engine 8 being arranged in the case 12 that is mounted to the vehicle body. The engine 8, the input shaft 14, and the first transmitting portion 16 are rotatably arranged in order centered on the first axis RC1. The input shaft 14 is either directly connected to the engine 8 or indirectly connected to the engine 8 via a pulsation absorbing damper (i.e., a pulsation damping device), not shown, and the like, and the first transmitting portion 16 is connected to that input shaft 14. Meanwhile, the second transmitting portion 112 and the differential drive gear 32, which serves as an output rotating member that is connected to the second transmitting portion 112, are rotatably arranged on the second axis RC2 that is parallel with the first axis RC1. The pair of counter gears CG together serve as a transmitting member that connects the first axis RC1 with the second axis RC2 so that power can be transmitted therebetween. The differential gear unit 36, on the other hand, is arranged on the third axis RC3, which is parallel to the second axis RC2, and rotatably driven by the differential drive gear 32. As is well known, the differential gear unit 36 includes a differential gear mechanism that is rotatably driven by a differential ring gear 34 which is in mesh with the differential drive gear 32. Power is sequentially transmitted to the pair of driving wheels 38 via a pair of axles and the like using the power distribution function of this differential gear mechanism.

The pair of counter gears CG includes a counter drive gear CG1 and a counter driven gear CG2. The counter drive gear CG1 is rotatably arranged concentric with the first transmitting portion 16 on the first axis RC1 and connected to the ring gear R0. The counter driven gear CG2 is rotatably arranged concentric with the second transmitting portion 112 on the second axis RC2 and connected to the second transmitting portion 112 via the first clutch C1 or the second clutch C2. The counter drive gear CG1 and the counter driven gear CG2 are in constant mesh with each another. For example, when the reduction gear ratio of the pair of counter gears CG (=the rotation speed of the counter drive gear CG1/the rotation speed of the counter driven gear CG2) is 1.000, the pair of counter gears CG corresponds to the transmitting member 18 that connects the first transmitting portion 16 with the second transmitting portion 20 in the first example embodiment shown in FIGS. 1 to 3. That is, the counter drive gear CG1 corresponds to a transmitting member on the first axis RC1 side which is the transmitting member 18, and the counter driven gear CG2 corresponds to a transmitting member on the second axis RC2 side which is the transmitting member 18.

Here, the arrangement (i.e., layout) of each part of the power transmitting apparatus 110 will be described with reference to FIG. 12. The pair of counter gears CG are arranged adjacent to the first transmitting portion 16 and on the opposite side of the first transmitting portion 16 from the engine 8. In other words, the first transmitting portion 16 is arranged between the engine 8 and the pair of counter gears CG. The second electric motor M2 is arranged on the first axis RC1 adjacent to the pair of counter gears CG in a position between the first transmitting portion 16 and the pair of counter gears CG, and is connected to the counter drive gear CG1. The differential drive gear 32 is arranged on the opposite side of the second transmitting portion 112 from the pair of counter gears CG from, i.e., on the engine 8 side. In other words, the second transmitting portion 112 is arranged adjacent to the pair of counter gears CG so as to be between the pair of counter gears CG and the differential drive gear 32 (the engine 8). The first planetary gear set 26 and the second planetary gear set 28 are arranged in that order from the pair of counter gears CG toward the differential drive gear 32. The first clutch C1 and the second clutch C2 are arranged between the pair of counter gears CG and the first planetary gear set 26.

The second transmitting portion 112 includes the first planetary gear set 26 and the second planetary gear set 28, both of which are single pinion type planetary gear sets. The first planetary gear set 26 includes the first sun gear S1, the first pinion gears P1, the first carrier CA1 which rotatably and revolvably supports the first pinion gears P1, and the first ring gear R1 that is in mesh with the first sun gear S1 via the first pinion gears P1, and has a gear ratio ρ1 of approximately 0.522, for example. The second planetary gear set 28 includes the second sun gear S2, the second pinion gears P2, the second carrier CA2 which rotatably and revolvably supports the second pinion gears P2, and the second ring gear R2 that is in mesh with the second sun gear S2 via the second pinion gears P2, and has a gear ratio ρ2 of approximately 0.309, for example.

In the second transmitting portion 112, the first sun gear S1 and the second sun gear S2 are integrally connected together as well as selectively connected to the counter driven gear CG2, which functions as the transmitting member, via the first clutch C1 and selectively connected to the case 12 via the second brake B2. The first carrier CA1 is selectively connected to the counter driven gear CG2 via the second clutch C2 as well as selectively connected to the case 12 via a third brake B3. The second ring gear R2 is selectively connected to the case 12 via the first brake B1. The first ring gear R1 and the second carrier CA2 are connected together as well as connected to the differential drive gear 32 that functions as an output member.

In the power transmitting apparatus 110 structured as described above, any gear from first gear to seventh gear, reverse (i.e., reverse gear), or neutral may be selectively established by selectively applying the switching clutch C0, the first clutch C1, the second clutch C2, the switching brake B0, the first brake B1, the second brake B2, and the third brake B3 in the combinations shown in the clutch and brake application chart in FIG. 13, for example. A gear ratio γ (=input shaft rotation speed $N_{IN}$/output shaft rotation speed $N_{OUT}$) that changes in substantially equal ratio is obtained for each forward gear. For example, when the power transmitting apparatus 110 is made to operate as a stepped transmission, various gears can be established as shown in FIG. 13. More specifically, first gear which has the largest gear ratio γ1, e.g., 4.241, can be established by applying the switching clutch C0, the first clutch C1, and the first brake B1. Second gear which has a gear ratio γ2 smaller than that of first gear, e.g., 2.986, can be established by applying the switching brake B0, the first clutch C1, and the first brake B1. Third gear which has a gear ratio γ3 smaller than that of second gear, e.g., 2.111, can be established by applying the switching clutch C0, the second clutch C2, the first brake B1. Fourth gear which has a gear ratio γ4 smaller than that of third gear, e.g., 1.482, can be established by applying the switching brake B0, the second clutch C2, and the first brake B1. Fifth gear which has a gear ratio γ5 smaller than that of fourth gear, e.g., 1.000, can be established by applying the switching clutch C0, the first clutch C1, and the second clutch C2. Sixth gear which has a gear ratio γ6 smaller than that of fifth gear, e.g., 0.657, can be established by applying the switching clutch C0, the second clutch C2, and the second brake B2. Seventh gear which has a gear ratio γ7 smaller than that of sixth gear, e.g., 0.463, can be established by applying the switching brake B0, the second clutch C2, and the second brake B2. Also, reverse which is used during either engine-running or motor-running and which has a gear ratio γR between that of third gear and that of fourth gear, e.g., 1.917, can be established by applying either the first clutch C1 and the third brake B3, or the first clutch C1 and the first brake B1. Incidentally, when the power transmitting apparatus 110 is in neutral "N", only the first clutch C1, for example, is applied.

In the description above, the gear ratios of adjacent gears change in equal ratio which is ideal for stepped shifting, and the change ratios between gears (i.e., i.e., the gear ratio step) are substantially constant. That is, the change ratio (γ1/γ2) of the gear ratio between first gear and second gear is 1.420, the change ratio (γ2/γ3) of the gear ratio between second gear and third gear is 1.415, the change ratio (γ3/γ4) of the gear ratio between third gear and fourth gear is 1.420, the change ratio (γ4/γ5) of the gear ratio between fourth gear and fifth gear is 1.487, the change ratio (γ5/γ6) of the gear ratio between fifth gear and sixth gear is 1.522, and the change ratio (γ6/γ7) of the gear ratio between sixth gear and seventh gear is 1.420. The total gear ratio width (γ1/γ7) is set to a substantially large value of 9.164.

Figure 14:
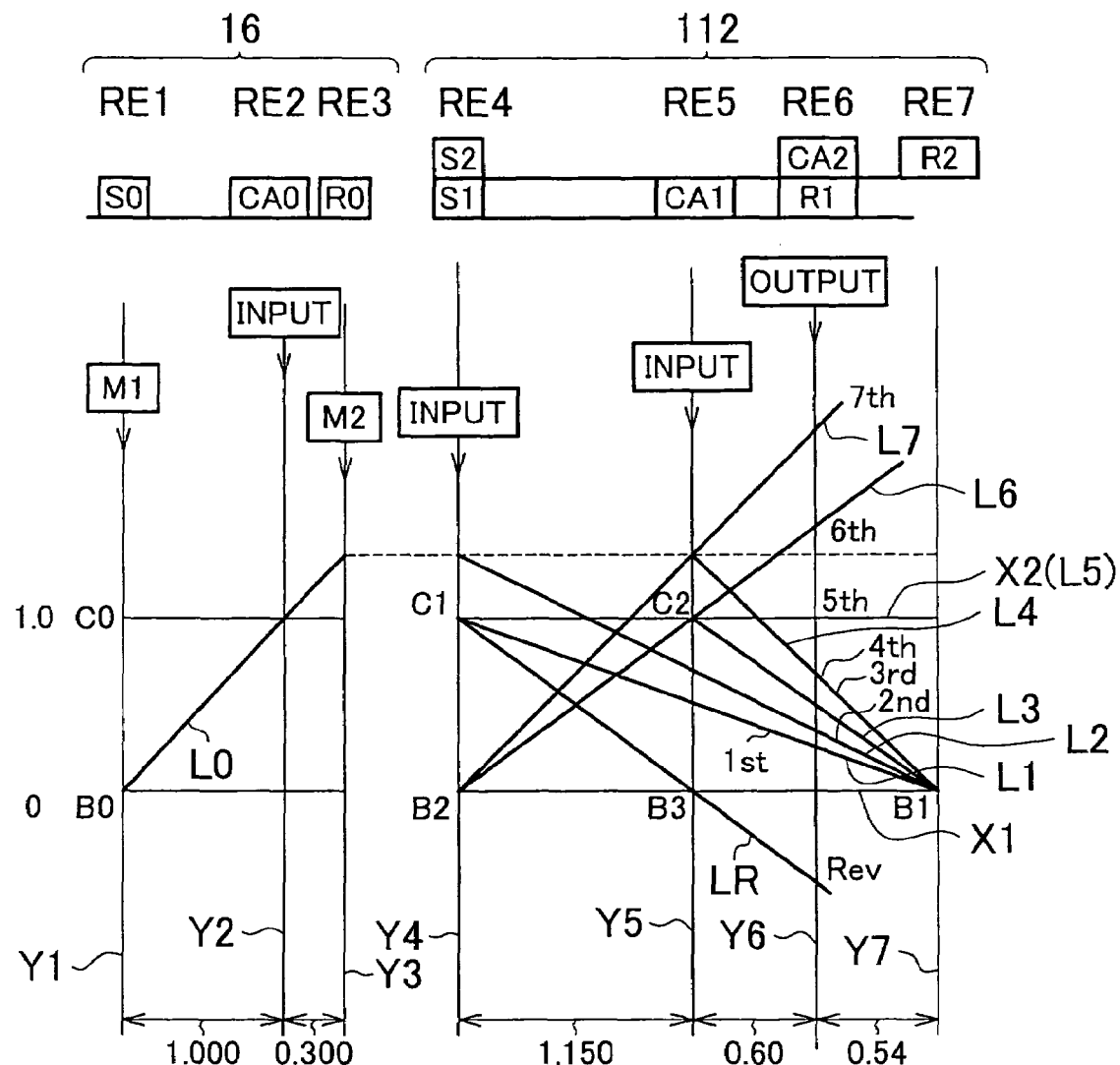
FIG. 14 is an alignment graph which corresponds to FIG. 3 and shows the relative rotation speeds in each gear when the power transmitting apparatus of the hybrid vehicle shown in FIG. 12 is made to shift in a stepped manner.

FIG. 14 is an alignment graph which shows the correlative relationships, on straight lines, among the rotation speeds of the various rotating elements that are in different connective states in each gear in the power transmitting apparatus 110 that includes the first transmitting portion 16 and the second transmitting portion 112 in this example embodiment. When expressed using the alignment graph in FIG. 14, the second transmitting portion 112 is structured such that the fourth rotating element RE4 (i.e., S1 and S2) is selectively connected to the counter driven gear CG2 via the first clutch C1 as well as selectively connected to the case 12 via the second brake B2, the fifth rotating element RE5 (i.e., CA1) is selectively connected to the counter driven gear CG2 via the second clutch C2 as well as selectively connected to the case 12 via the third brake B3, the sixth rotating element RE6 (i.e., R1 and CA2) is connected to the differential drive gear 32, and the seventh rotating element RE7 (i.e., R2) is selectively connected to the case 12 via the first brake B1. Incidentally, the predetermined gear ratio ρ0 of the planetary gear set 24 in this example embodiment is 0.300, for example.

Here, when the power transmitting apparatus 110 is in the stepped shift state, it shifts in a stepped manner between 1st gear and 7th gear. However, just as in the first example embodiment described above, when shifting between 2nd gear and 3rd gear or between 4th gear and 5th gear, a simultaneous shift occurs in which a shift is performed in the first transmitting portion 16 at the same time that a shift is performed in the second transmitting portion 112, as can be seen from the clutch and brake application chart in FIG. 13. Therefore, the electronic control apparatus 40 in this example embodiment is also provided not only with the switching control unit 50, the hybrid control unit 52, the stepped shift control unit 54, and the shift line graph storing unit 56, but also the shift state determining unit 70 and the simultaneous shift control unit 72, just like the first example embodiment. The electronic control apparatus 40 of this example embodiment yields the same effects as the effects (A1) to (A9) of the first example embodiment described above.

While example embodiments of the invention have been described in detail with reference to the drawings, the invention is not limited to these example embodiments. To the contrary, the invention is intended to cover various modifications and improvements based the knowledge of those skilled in the art.

For example, the power transmitting apparatus 10 or 110 described above is used in a hybrid vehicle. However, the power transmitting apparatus 10 or 110 may also be structured without a motor-running function. That is, the power transmitting apparatus 10 or 110 may also be structured for use in a normal vehicle that is driven by the engine 8.

Also, in the example embodiments described above, the power transmitting apparatus 10 or 110 includes the first electric motor M1 and the first transmitting portion 16 as a power distributing mechanism that distributes output from the engine 8 to the first electric motor M1 and the transmitting member 18. Alternatively, for example, the first electric motor M1 and the first transmitting portion 16 may be omitted and the invention applied to a so-called parallel hybrid vehicle in which the engine 8, a clutch, the second electric motor M2, the second transmitting portion 20 or 112, and the driving wheels 38 are connected in series. In this case, the second transmitting portion 20 or 112 of the parallel hybrid vehicle is formed from two transmitting portions. The invention is also effective when a simultaneous shift is performed in those two transmitting portions during a shift in the parallel hybrid vehicle. Incidentally, the clutch between the engine 8 and the second electric motor M2 may be provided as necessary so a parallel hybrid vehicle without that clutch is also conceivable.

Moreover, in the example embodiments described above, the speed synchronizing control of the second transmitting portion 20 or 112 is performed using the second electric motor M2. However, when the switching clutch C0 is applied, the first electric motor M1 and the second electric motor M2 rotate together so speed synchronizing control of the second transmitting portion 20 or 112 may also be performed using the first electric motor M1 together with the second electric motor M2, instead of just the second electric motor M2.

In the example embodiments described above, when the shift state determining unit 70 makes a positive determination, the simultaneous shift control unit 72 ends the shift in the second transmitting portion 20 or 112 after the shift in the first transmitting portion 16 has already ended. However, the simultaneous shift control unit 72 may also end the shift in the second transmitting portion 20 or 112 after a predetermined period of time or more has passed after the shift in the first transmitting portion 16 has ended. This is because if the period of time between the time that the shift in the first transmitting portion 16 ends and the time that the shift in the second transmitting portion 20 or 112 ends is too short, the shift shock generated when one shift ends overlaps with the shift shock generated when the other shift ends, thereby increasing the possibility of an occupant feeling significant shift shock. Having the simultaneous shift control unit 72 end the shift in the second transmitting portion 20 or 112 after a predetermined period of time or more has passed after the shift in the first transmitting portion 16 has ended enables this to be avoided. Incidentally, the predetermined period of time from the time the shift in the first transmitting portion 16 ends until the shift in the second transmitting portion 20 or 112 ends is set to the shortest amount of time that the ends of the shifts need to be offset in order to keep the occupant from feeling significant shift shock. This predetermined period of time is obtained through testing or the like beforehand and stored in the simultaneous shift control unit 72 in advance.

Also in the example embodiments described above, when the shift state determining unit 70 makes a positive determination, the simultaneous shift control unit 72 controls the shift in the first transmitting portion 16 using the first electric motor M1 and controls the shift in the second transmitting portion 20 or 112 using the second electric motor M2. Alternatively, however, the shift in only one transmitting portion (either the first transmitting portion 16 or the second transmitting portion 20 or 112) may be controlled by an electric motor.

Further, in the example embodiments described above, when a simultaneous shift occurs in the power transmitting apparatus 10 or 110, the transmitting portion in which the gear ratio changes in the same direction as the total gear ratio γT of the overall power transmitting apparatus 10 or 110 changes is always the second transmitting portion 20 or 112, and the transmitting portion in which the gear ratio changes in the opposite direction as the total gear ratio γT of the overall power transmitting apparatus 10 or 110 changes is always the first transmitting portion 16. However, the invention may also be applied in a case in which it is possible that the relationship between these directions of change in the gear ratios may be reversed, i.e., in a case in which the transmitting portion in which the gear ratio changes in the same direction as the total gear ratio γT of the overall power transmitting apparatus 10 or 110 changes is the first transmitting portion 16, and the transmitting portion in which the gear ratio changes in the opposite direction as the total gear ratio γT of the overall power transmitting apparatus 10 or 110 changes is the second transmitting portion 20 or 112. Incidentally, when the transmitting portion in which the gear ratio changes in the opposite direction as the total gear ratio γT of the overall power transmitting apparatus 10 or 110 changes is the second transmitting portion 20 or 112 and the shift state determining unit 70 makes a positive determination, the simultaneous shift control unit 72 starts the shift (i.e., the inertia phase) of the second transmitting portion 20 or 112 after starting the shift (i.e., starting the inertia phase) of the first transmitting portion 16, and ends the shift in the second transmitting portion 20 or 112 during the shift in the first transmitting portion 16 (i.e., while the shift in the first transmitting portion 16 is being performed).

Also in the example embodiments described above, the first transmitting portion 16 functions as an electric continuously variable transmission in which the gear ratio γ0 thereof is changed in a continuous manner from the minimum value γ0min to the maximum value γ0max by controlling the operating state of the first electric motor M1. Alternatively, however, the gear ratio γ0 of the first transmitting portion 16 may also be changed in a stepped manner using a differential operation, instead of in a continuous manner, for example.

Further, in the example embodiments described above, the engine 8 and the first transmitting portion 16 are directly connected in the power transmitting apparatus 10 or 110. Alternatively, however, the engine 8 may be connected to the first transmitting portion 16 via an apply element such as a clutch.

Also in the example embodiments described above, the engine 8 is directly connected to the input shaft 14. Alternatively, for example, the engine 8 may be operatively linked to the input shaft 14 via a gear or a belt, for example, so that the two do not have to be arranged on the same axis.

Moreover, in the example embodiment, the first electric motor M1 and the second electric motor M2 are arranged on the same axis as the input shaft 14, and the first electric motor M1 is connected to the sun gear S0 and the second electric motor M2 is connected to the transmitting member 18. However, the first electric motor M1 and the second electric motor M2 do not necessarily have to be arranged in this way. For example, the first electric motor M1 may be operatively connected to the first sun gear S1 via a gear, a belt, or reduction gears or the like, and the second motor M2 may be operatively connected to the transmitting member 18 also via a gear, a belt, or reduction gears or the like.

Also in the example embodiments described above, in the power transmitting apparatus 10 and 110, the first electric motor M1 is directly connected to the first rotating element RE1, and the second electric motor M2 is directly connected to the third rotating element RE3. Alternatively, for example, the first electric motor M1 may be connected to the first rotating element RE1 via an apply element such as a clutch, and the second electric motor M2 may be connected to the third rotating element RE3 also via an apply element such as a clutch.

Further, in the example embodiments described above, the second transmitting portion 20 or 112 is connected after the first transmitting portion 16 in the power transmitting path from the engine 8 to the driving wheels 38. Alternatively, however, the order may be reversed, i.e., the first transmitting portion 16 may be connected after the second transmitting portion 20 or 112 in the power transmitting path from the engine 8 to the driving wheels 38. In other words, the second transmitting portion 20 or 112 may form a portion of the power transmitting path from the engine 8 to the driving wheels 38.

Also in the example embodiments described above, the first transmitting portion 16 and the second transmitting portion 20 or 112 are connected in series. However, the invention may also be applied in a case in which the first transmitting portion 16 and the second transmitting portion 20 or 112 are not mechanically independent if an electric differential function which can electrically change the differential state of the overall power transmitting apparatus 10 or 110, and a function that shifts according to a different principle than a shift according to that electric differential function are provided.

Also, in the example embodiments described above, the first transmitting portion 16 is a single planetary gear set but it may also be a double planetary gear set.

Also, in the example embodiments described above, the first electric motor M1 is connected to the first rotating element RE1 that constitutes the planetary gear set 24 such that power can be transmitted therebetween, the engine 8 is connected to the second rotating element RE2 such that power can be transmitted therebetween, and the power transmitting path to the driving wheels 38 is connected to the third rotating element RE3. Alternatively, however, the invention may also be applied to a structure i) in which two planetary gear sets are connected together by a rotating element of a portion that forms a part of both planetary gear sets, and the engine, the electric motor, and the driving wheels are each connected to a different rotating element of those planetary gear sets, and ii) which is able to switch between performing a stepped shift and performing a continuously variable shift by controlling a clutch or a brake that is connected to the rotating element of those planetary gear sets, for example.

Moreover, in the example embodiments described above, the second electric motor M2 is directly connected to the transmitting member 18, but the connective position of the second electric motor M2 is not limited to this. Alternatively, the second electric motor M2 may be connected either directly or indirectly via a transmission, planetary gear set, or apply device or the like, to the power transmitting path between the engine 8 or the transmitting member 18 to the driving wheels 38.

Also, in the first transmitting portion 16 in the example embodiments described above, the carrier CA0 is connected to the engine 8, the sun gear S0 is connected to the first electric motor M1, and the ring gear R0 is connected to the transmitting member 18. However, the connective relationships are not necessarily limited to these. For example, the engine 8, the first electric motor M1, and the transmitting member 18 may be connected to any of the three elements CA0, S0, and R0 of the planetary gear set 24.

Also, the first transmitting portion 16 in the foregoing example embodiment is made up of a single planetary gear set, but it may also be made up of two or more planetary gear sets such that when it is in the non-differential state (i.e., a fixed shift state) it functions as a transmission with three or more speeds.

Further, in the example embodiments described above, the second electric motor M2 is connected to the transmitting member 18 that constitutes a portion of the power transmitting path from the engine 8 to the driving wheels 38. However, the power transmitting apparatus 10 or 110 may be structured such that the second electric motor M2 can also be connected to the first transmitting portion 16 via an apply element such as a clutch in addition to being connected to the power transmitting path, so the differential state of the first transmitting portion 16 can be controlled by the second electric motor M2 instead of the first electric motor M1.

Also, the switching clutch C0 selectively connects the sun gear S0 to the carrier CA0, but it may also selectively connect the sun gear S0 to the ring gear R0 or the carrier CA0 to the ring gear R0. In other words, the switching clutch C0 may connect any two of the three elements of the planetary gear set 24 together.

Also in the example embodiments described above, the hydraulic friction apply devices such as the switching clutch C0 and the switching brake B0 may be magnetic-particle type apply devices such as powder (magnetic particle) clutches, electromagnetic type apply devices such as electromagnetic clutches, or mechanical type apply devices such as mesh type dog clutches or the like.

Also, the first transmitting portion 16 in the foregoing example embodiments may also be a differential gear unit in which a pinion which is rotatably driven by the engine 8 and a pair of umbrella gears that are in mesh with that pinion are operatively linked to the first electric motor M1 and the second electric motor M2, for example.

Also, instead of the pair of counter gears CG as the transmitting member in the second example embodiment, the transmitting member may also be formed by a sprocket arranged on the first axis RC1, which is operatively connected to a sprocket arranged on the second axis RC2 by a chain which is wound around both sprockets. Also, instead of the sprockets and chain that is wound around them, a pulleys and a belt or the like may be used. In these cases, the relationship between the rotational direction of the engine 8 and the rotational direction of the driving wheels 38 is opposite that when the pair of counter gears CG are used so a countershaft, for example, may be added.

Also, in the power transmitting apparatus 10 or 110 in the foregoing example embodiments, a total of seven gears can be consistently established with two middle gears, i.e., 2nd gear and 4th gear, by switching the constant speed gear ratio of the first transmitting portion 16 to the high speed side by applying the brake B0. Alternatively, however, a total of six gears may be established by having either only 2nd gear or only 4th gear, or a total of eight gears may be established by further adding a third middle gear between 5th gear and 6th gear.

What is claimed is:

1. A vehicular drive control apparatus comprising:
   a first transmitting portion;
   a second transmitting portion; and
   at least one electric motor which is connected, so as to be able to transmit power, to a rotating element of the first transmitting portion or the second transmitting portion, the rotation speed of the rotating element changing as a shift in the first transmitting portion or the second transmitting portion progresses, wherein:
   in either of the first transmitting portion and the second transmitting portion, a change of engagement between engagement elements, provided for the first transmitting portion and the second transmitting portion, is performed by hydraulic control to make a shift progress,
   when a shift by the change of engagement between the engagement elements is performed in the first transmitting portion at the same time that a shift by the change of engagement between the engagement elements is performed in the second transmitting portion and the direction in which a gear ratio of the first transmitting portion changes is opposite the direction in which the gear ratio of the second transmitting portion changes, the at least one electric motor controls the shift in one or both of the first transmitting portion and the second transmitting portion such that the shift in one of the transmitting portions, from among the first transmitting portion and the second transmitting portion, ends while the shift in the other transmitting portion, from among the first transmitting portion and the second transmitting portion, is being performed; and
   if it is predicted that an inertia phase of the shift in the one transmitting portion will not end before an inertia phase of the shift in the other transmitting portion, an input rotation speed of the other transmitting portion is controlled by the electric motor, included in the at least one electric motor, that is connected to the rotating element of the other transmitting portion, to slow a progress of the shift in the other transmitting portion so that the inertia phase of the shift in the one transmitting portion ends before the inertia phase of the shift in the other transmitting portion.

2. The vehicular drive control apparatus according to claim 1, wherein when a shift by the change of engagement between the engagement elements is performed in the first transmitting portion at the same time that a shift by the change of engagement between the engagement elements is performed in the second transmitting portion and the direction in which a gear ratio of the first transmitting portion changes is opposite the direction in which the gear ratio of the second transmitting portion changes, an inertia phase of the shift in one transmitting portion, from among the first transmitting portion and the second transmitting portion, whichever has the gear ratio that changes in the opposite direction as the direction in which the gear ratio of the vehicular drive control apparatus changes, is started after the inertia phase of the shift in the other transmitting portion, from among the first transmitting portion and the second transmitting portion, whichever has the gear ratio that changes in the same direction as the direction in which the gear ratio of the vehicular drive control apparatus changes, has started, and the shift in the one transmitting portion is ended while the shift in the other transmitting portion is being performed.

3. The vehicular drive control apparatus according to claim 1, wherein the at least one electric motor is used in conjunction with the hydraulic control in shift control of one or both of the first transmitting portion and the second transmitting portion.

4. The vehicular drive control apparatus according to claim 1, wherein when a shift by the change of engagement between the engagement elements is performed in the first transmitting portion at the same time that a shift by the change of engagement between the engagement elements is performed in the second transmitting portion and the direction in which a gear ratio of the first transmitting portion changes is opposite the direction in which the gear ratio of the second transmitting portion changes, the shift in the first transmitting portion is ended during the inertia phase of the shift in the second transmitting portion.

5. The vehicular drive control apparatus according to claim 1, wherein the first transmitting portion is connected to an internal combustion engine and the second transmitting portion constitutes a portion of a power transmitting path from the first transmitting portion to a driving wheel.

6. The vehicular drive control apparatus according to claim 5, wherein the vehicular drive control apparatus includes a first electric motor and a second electric motor as the at least one electric motor, wherein:
   the first transmitting portion has a plurality of rotating elements;
   the first electric motor, the internal combustion engine, and the second transmitting portion are connected, so as to be able to transmit power, to different rotating elements of the first transmitting portion; and
   when a shift by the change of engagement between the engagement elements is performed in the first transmitting portion at the same time that a shift by the change of engagement between the engagement elements is performed in the second transmitting portion and the direction in which the gear ratio of the first transmitting portion changes is opposite the direction in which the gear ratio of the second transmitting portion changes, the vehicular drive control apparatus controls the change in the speed of the internal combustion engine using the first electric motor.

7. The vehicular drive control apparatus according to claim 5, wherein:
   the vehicular drive control apparatus includes a first electric motor and a second electric motor as the at least one electric motor;
   the first transmitting portion has a plurality of rotating elements;
   the first electric motor, the internal combustion engine, and the second transmitting portion are connected, so as to be able to transmit power, to different rotating elements of the first transmitting portion; and
   when a shift by the change of engagement between the engagement elements is performed in the first transmitting portion at the same time that a shift by the change of engagement between the engagement elements is performed in the second transmitting portion and the direction in which the gear ratio of the first transmitting portion changes is opposite the direction in which the gear ratio of the second transmitting portion changes, the vehicular drive control apparatus controls the rotation speed of the first electric motor according to a change in an input rotation speed of the second transmitting portion.

8. The vehicular drive control apparatus according to claim 5, wherein output torque of the internal combustion engine is reduced when the speed of the internal combustion engine is changing during the shift by the change of engagement between the engagement elements in the first transmitting portion.

* * * * *